United States Patent
Eom et al.

(10) Patent No.: US 9,906,890 B2
(45) Date of Patent: Feb. 27, 2018

(54) METHOD AND APPARATUS FOR REGISTERING DEVICES IN GATEWAY

(71) Applicant: Samsung Electronics Co., Ltd., Gyeonggi-do (KR)

(72) Inventors: Chungyong Eom, Seoul (KR); Apoorv Kansal, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 303 days.

(21) Appl. No.: 14/745,938

(22) Filed: Jun. 22, 2015

(65) Prior Publication Data

US 2015/0373481 A1 Dec. 24, 2015

(30) Foreign Application Priority Data

Jun. 20, 2014 (KR) .................. 10-2014-0075818

(51) Int. Cl.
*H04W 4/00* (2009.01)
*H04W 76/02* (2009.01)
*H04W 48/00* (2009.01)

(52) U.S. Cl.
CPC .......... *H04W 4/005* (2013.01); *H04W 48/17* (2013.01); *H04W 76/021* (2013.01); *H04W 76/022* (2013.01); *H04W 48/00* (2013.01)

(58) Field of Classification Search
CPC . H04W 76/02; H04W 76/021; H04W 76/022; H04W 4/005; H04W 48/17; H04W 48/00
See application file for complete search history.

(56) References Cited

U.S. PATENT DOCUMENTS

| 2006/0227766 A1 | 10/2006 | Mickle et al. |
| 2008/0095179 A1* | 4/2008 | Lee ............ H04L 12/66 370/401 |
| 2009/0210532 A1 | 8/2009 | Lim et al. |
| 2011/0066750 A1 | 3/2011 | Cochard et al. |

(Continued)

OTHER PUBLICATIONS

International Search Report dated Oct. 8, 2015 issued in counterpart application No. PCT/KR2015/006053, 4 pages.

*Primary Examiner* — Ashley Shivers
(74) *Attorney, Agent, or Firm* — The Farrell Law Firm, P.C.

(57) ABSTRACT

A method and apparatus for a master gateway to register a device in a smart home network system. The method includes selecting performance parameters related to the device measured by at least two gateways including the master gateway; collecting, from the at least two gateways, at least one first information item about the performance parameters measured for the device capable of being registered in the at least two gateways; creating second information used to register the device, based on the at least one first information item, by the at least two gateways; and instructing one of the at least two gateways to register the device, based on the second information. The present invention relates to a sensor network, Machine Type Communication (MTC), Machine-to-Machine (M2M) communication, and technology for the Internet of Things (IoT). The present invention may be applied to intelligent services based on the above technologies, such as smart home, smart building, smart city, smart car, connected car, health care, digital education, smart retail, and security and safety services.

20 Claims, 31 Drawing Sheets

(56) References Cited

U.S. PATENT DOCUMENTS

| | | | |
|---|---|---|---|
| 2011/0243113 | A1 | 10/2011 | Hjelm et al. |
| 2012/0317254 | A1* | 12/2012 | Chekhanovskiy .. H04L 61/1511 709/222 |
| 2013/0077664 | A1 | 3/2013 | Lee |
| 2014/0066062 | A1 | 3/2014 | Chen et al. |
| 2015/0282217 | A1* | 10/2015 | Kim ...................... H04W 76/02 709/223 |
| 2017/0094706 | A1* | 3/2017 | Kim .................... H04W 76/023 |

* cited by examiner

FIG. 3

Performance parameter list

| Domain | Parameters |
|---|---|
| Availability | Failure Rate |
| | Down Time |
| | Service Execution Time |
| Response Time | Ping Time |
| Coverage | RSSI |
| H/W specification | CPU |
| | Memory |
| | Storage |
| Load index | Device Load |
| | Service Load | measurement unit of selected parameter

| | | |
|---|---|---|
| Signal Strength (RSSI) | SIGNAL(i) | (dbm) |
| Response Time (Ping time) | PING(s) | (milliseconds) |
| CPU specification | CPU(a), CPU(b)... | (Mhz) |
| Memory specification | MEM(a), MEM(b),... | (Mbyte) |
| Failure Rate | Fail(n) | (%) |
| Running Time | RUN(n) | (seconds) |
| Down Time | DOWN(n) | (seconds) |
| Device Load | DEV(n) | (Qty.) |
| Service Load | SVC(n) | % |

FIG. 4

```
private List <GW> prepareGWSuggestionList() {
    Define Max Timeout
    List <GW> :initialize an empty list
    for(each GW) {
        for(each parameter){          //First get the raw score
            find the raw score,
        }
        for(each parameter){          // Second Normalize the score
            if (raw score was not fetched due to timeout Or any other error){
                Do not consider the score of this parameter for calculations
                //Since we have to return a result (A preferred GW) to the user in a specified time limit
                raw score of this parameter = 0,
            }
            normalize the score
        }
        calculate the weighted sum of the score for all parameter
        store it in List<GW>
    }
    sort the List<GW>
    check for tie,
    if(tie){
        choose top } parameters (drop least weighted parameter, e.g.) can start from N-1}
        while (j > 0){
            calculate the weighted sum of the scores for allGWs considering the } parameters
            if(tie is resolved based on) parameters){
                rearrange GW in List<GW>
                break,
            }
            eles{
                j--;
            }
        }
    }
    return List<GW>
}
```

FIG. 9 weights allocated according to selected parameters

| Domain | Device Type | Parameters ||||||||
|---|---|---|---|---|---|---|---|---|
| | | Ping Time | CPU | Memory | Number of Devices | Running Time | Down Time | Failure Rate |
| Security | Motion Sensor | 50% | . | . | . | . | 25% | 25% |
| | IP Cam | 20% | 25% | 25% | . | . | 15% | 15% |
| | Door Lock | 40% | . | . | . | . | 30% | 30% |
| | CO Sensor | 40% | . | . | . | . | 30% | 30% |
| Entertainment and Living | TV | 20% | . | . | 80% | . | . | . |
| | Air-Conditioner | 20% | . | . | 80% | . | . | . |
| | Washer | 20% | . | . | 80% | . | . | . |
| | Oven | 20% | . | . | 80% | . | . | . |
| | Smart Socket | 40% | . | . | 60% | . | . | . |
| | Light | 40% | . | . | 60% | . | . | . |
| Environment | Thermostat | . | 25% | 25% | 50% | . | . | . |
| | Temperature Sensor | . | . | . | 50% | 50% | . | . |
| | Humidity Sensor | . | . | . | 50% | 50% | . | . |
| [...] | [...] | [...] | [...] | [...] | [...] | [...] | [...] | [...] |

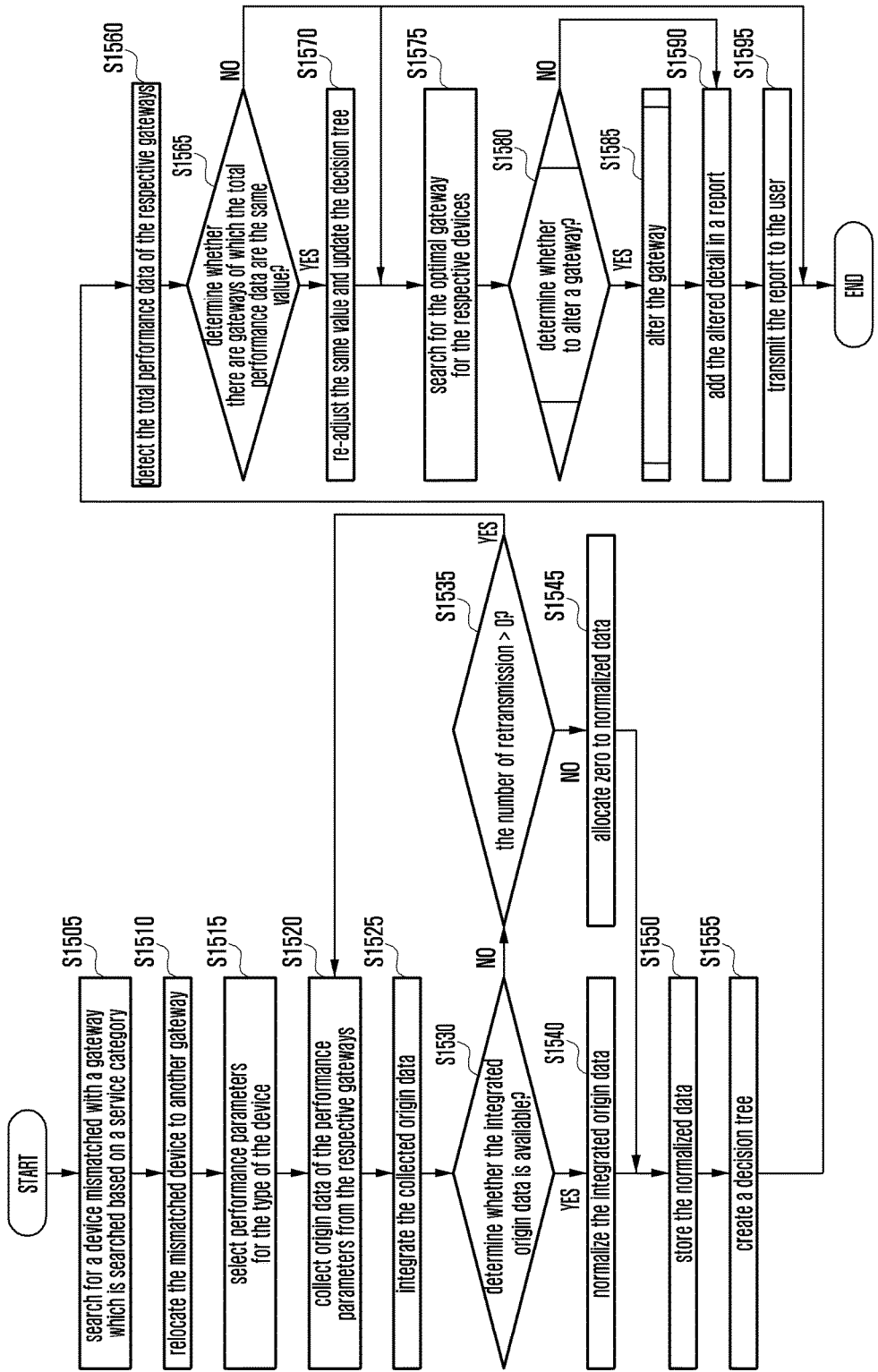

FIG. 17

```
private Map<Device, GW> performAutoCorrection() {
    Set RetryCount (e.g. 5)
    Map<Device, GW>: Initialize an empty map
    ChangeReport : initialize an empty string
    SuggestionReport : initialize an empty string
    List<GW> : initialize an empty list to store the score of the GWs Group all the devices for all the GWs by their device Type
    for(each GW) {
        for(each parameter){
            find the raw score
            if( raw score in not fetched && Retrycount > 0} {
                find the raw score
            }
            normalize the score
            reset RetryCount;    // to be used with next parameter
        }
        calculate the weighted sum of the score for all parameter
        store it in List<GW>
    } for(each device){
        based on GW score and device type find the "best suitable GW"
        find the difference in the score of "current owner GW" and "best suitable GW"
        if(difference <= 10%){
            let the device remain with the "current owner GW"
            continue;
        }else{
            add an entry in Map<Device, GW>
        }
    }
    for(each entry in Map<Device, GW>){
        if(allowed to change the ownership of device){
            change the ownership to better GW
            remove the entry of the device from Map<Device, GW>
            add this to changeReport
        }else{
            add this to SuggestionReport
        }
    }
    email ChangeReport and SuggestionReport to the user
    return Map<Device, GW>
}
```

METHOD AND APPARATUS FOR REGISTERING DEVICES IN GATEWAY

PRIORITY

This application claims priority under 35 U.S.C. § 119(a) to a Korean Patent Application filed on Jun. 20, 2014 in the Korean Intellectual Property Office and assigned Serial No. 10-2014-0075818, the entire content of which is incorporated herein by reference.

BACKGROUND

1. Field of the Invention

The present invention relates generally to a method and apparatus for registering devices in a gateway, and more particularly, to a method and apparatus for registering devices in a gateway in a multi-gateway environment.

2. Description of the Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "security technology" have increased in demand for IoT implementation, a sensor network, a Machine-to-Machine (M2M) communication, Machine Type Communication (MTC), and so forth have recently been researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In conventional home network systems, devices inside a home usually have been managed by a single gateway. As the era of IoT is coming and the smart home market is growing, a multi-gateway environment that supports various types of devices and allows for the network coverage enlargement will be introduced in the near future. In a multi-gateway environment, one of the most important issues is related to a device management, i.e., a process to detect the optimal gateway when a new device is registered. Conventional arts are, however, disadvantageous because they have not provided a method of detecting an optimal gateway.

Conventional technologies for device management by a multi-gateway are related to a method of registering a Home Network System, a Register Controller and Home devices. Devices may be registered in a Register Controller. A gateway performs management by mapping the Unique Identification Number (UID) of a Register Controller to a region that the Register Controller belonged to. When there is a plurality of gateways capable of being registered, conventional technologies have not determined the optimal gateway to manage devices.

SUMMARY

The present invention has been made to address the above-mentioned problems, and to provide at least the advantages described below.

Accordingly, an aspect of the present invention provides a method and apparatus that determines and registers an optimal gateway based on service categories of devices and/or performance parameters.

In accordance with an aspect of the present invention, a method of a master gateway to register a device in a smart home network system is provided. The method includes selecting performance parameters related to the device measured by at least two gateways including the master gateway; collecting, from the at least two gateways, at least one first information item about the performance parameters measured for the device capable of being registered in the at least two gateways; creating second information used to register the device, based on the at least one first information item, by the at least two gateways; and instructing one of the at least two gateways to register the device, based on the second information.

In accordance with another aspect of the present invention, a method of a master gateway to register a device in a smart home network system is provided. The method includes determining a service category of the device to be registered; searching for a gateway based on the determined service category; and instructing, when the gateway is searched, the searched gateway to register the device.

In accordance with another aspect of the present invention, a master gateway for registering a device in a smart home network system is provided. The device includes an interface unit configured to transmit/receive information to/from at least one of clients, other gateways, and devices; and a controller configured to select performance parameters related to the device measured by at least two gateways including the master gateway; collect, from the at least two gateways, at least one first information item about the performance parameters measured for the device capable of being registered in the at least two gateways; create second information used to register the device, based on the at least one first information item, by the respective at least two gateways; and instruct one of the at least two gateways to register the device, based on the second information.

In accordance with another aspect of the present invention, a master gateway for registering a device in a smart home network system is provided. The device includes an interface unit configured to transmit/receive information to/from at least one of clients, other gateways, and devices; and a controller configured to determine a service category of the device to be registered; search for a gateway based on the determined service category; and instruct, when the gateway is searched, the searched gateway to register the device.

BRIEF DESCRIPTION OF THE DRAWINGS

The above and other aspects, features and advantages of the present invention will be more apparent from the following detailed description, taken in conjunction with the accompanying drawings, in which:

FIG. 3 is a list of performance parameters and measurement units selected in step S210 of FIG. 2A, by types of devices, according to an embodiment of the present invention;

FIG. 4 illustrates pseudo code of a calculation function executed by a master gateway after collecting raw data obtained from measurement in step S215 of FIG. 2A, according to an embodiment of the present invention;

FIG. 9 is a chart of weights that are allocated to performance parameters and to device types according to an embodiment of the present invention;

FIG. 15 is a flowchart of a method of suggesting a gateway to register a device in the gateway in a multi-gate environment according to an embodiment of the present invention;

FIG. 17 is an illustration of pseudo code of a background task of FIG. 16 according to an embodiment of the present invention;

DETAILED DESCRIPTION OF EMBODIMENTS OF THE PRESENT INVENTION

Figure 1:
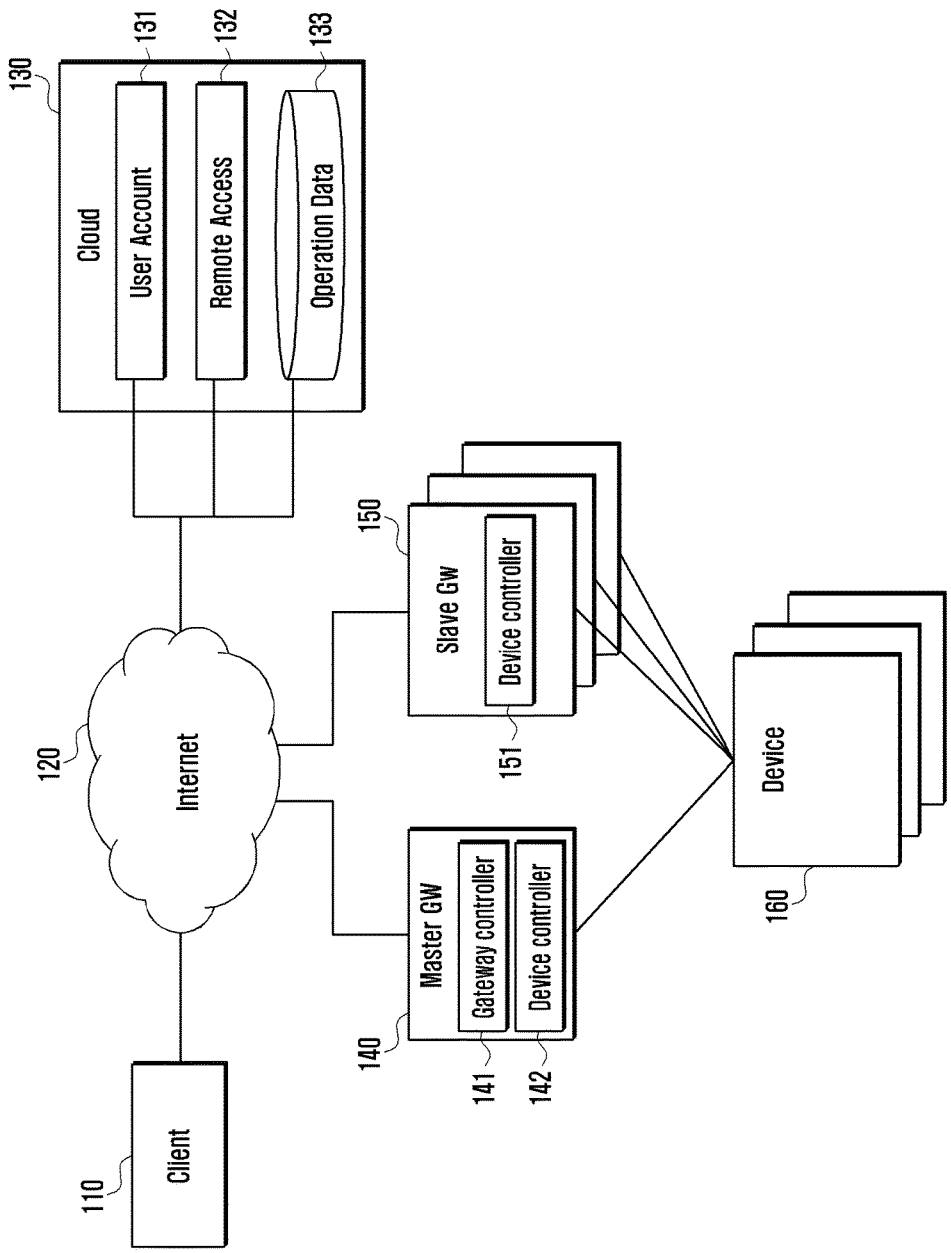
FIG. 1 is a block diagram of a smart home network system according to an embodiment of the present invention.

Hereinafter, embodiments of the present invention are described in detail with reference to the accompanying drawings.

Detailed descriptions of well-known functions and structures incorporated herein may be omitted to avoid obscuring the subject matter of the present invention.

The accompanying drawings are not necessarily to scale and certain features may be exaggerated or omitted in order to better illustrate and explain the present invention. The same reference numbers are used throughout the drawings to refer to the same or similar parts.

The features and advantages of the present invention and the method to achieve them will become more apparent from the following detailed description in conjunction with the accompanying drawings. It will be easily appreciated by those skilled in the art that various modifications, additions and substitutions are possible from the embodiments of the present invention that are illustrated and described in detail in the following description, and the scope of the present invention should not be limited to the following embodiments. The embodiments of the present invention are provided such that those skilled in the art completely understand the present invention. It should be understood that the present invention may include all modifications and/or equivalents and/or substations included in the scope and spirit of the present disclosure. In the accompanying drawings, the same or similar elements are denoted by the same reference numerals even though they are depicted in different drawings.

The terms or words described in the description and the appended claims should not be limited by a general or lexical meaning, instead should be analyzed as a meaning and a concept through which the inventor defines and describes the present invention to the best of his/her ability, to comply with the scope and spirit of the invention.

FIG. 1 is a block diagram of a smart home network system according to an embodiment of the present invention.

Referring to FIG. 1, the client 110 may remotely access a gateway (master 140 and/or slave 150) inside a home. The client 110 may control the entire operation of the devices 160. In general, the client 110 may refer to a system controlled by users. In the following description, the client 110 and users may be used in the same sense.

The cloud 130 may manage channels for remote access between the client 110 and a gateway (master 140 and/or slave 150) inside a home. The cloud 130 may manage user accounts. The cloud 130 may manage operation data collected from a gateway inside a home.

The master gateway 140 may manage at least one slave gateway 150 configuring a home network. The master gateway 140 may manage registration/release of devices 160 in/from respective gateways. The master gateway 140 may execute algorithms for the devices 160.

The slave gateway 150, as a gateway configuring a home network, may be subject to the master gateway 140, and may manage operations of the devices 160 registered in respective gateways, according to the instructions of the client 110.

The devices 160 may be a physical/function unit that is registered in a gateway configuring a home network and performs functions to provide real services to a user.

Embodiments of the present invention provide a method of determining an optimal gateway to register devices in a multi-gateway environment. To this end, the master gateway 140 suggests an optimal gateway to the client 110 based on service categories of devices and/or performance parameters (e.g., load, signal strength, etc.). The suggestion of an optimal gateway by the master gateway 140 is performed with the following three methods.

A first method suggests a gateway to register devices based on performance parameters.

A second method suggests a gateway to register devices based on service categories of the devices.

A third method automatically controls a gateway to register devices through a periodic background task.

Figure 2A:
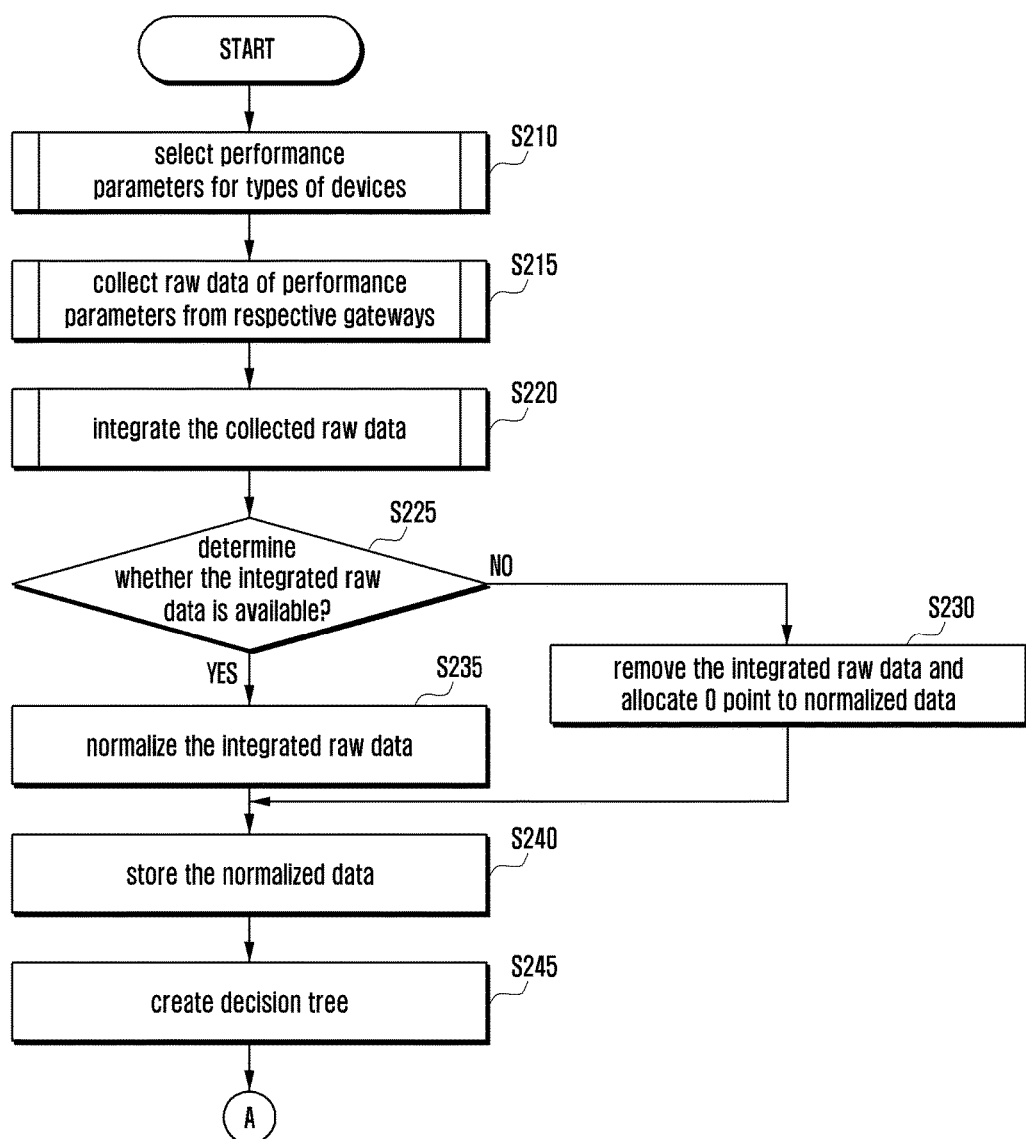
FIGS. 2A and 2B are a flowchart of a method of suggesting a gateway to register devices in a multi-gate environment according to an embodiment of the present invention.
Figure 2B:
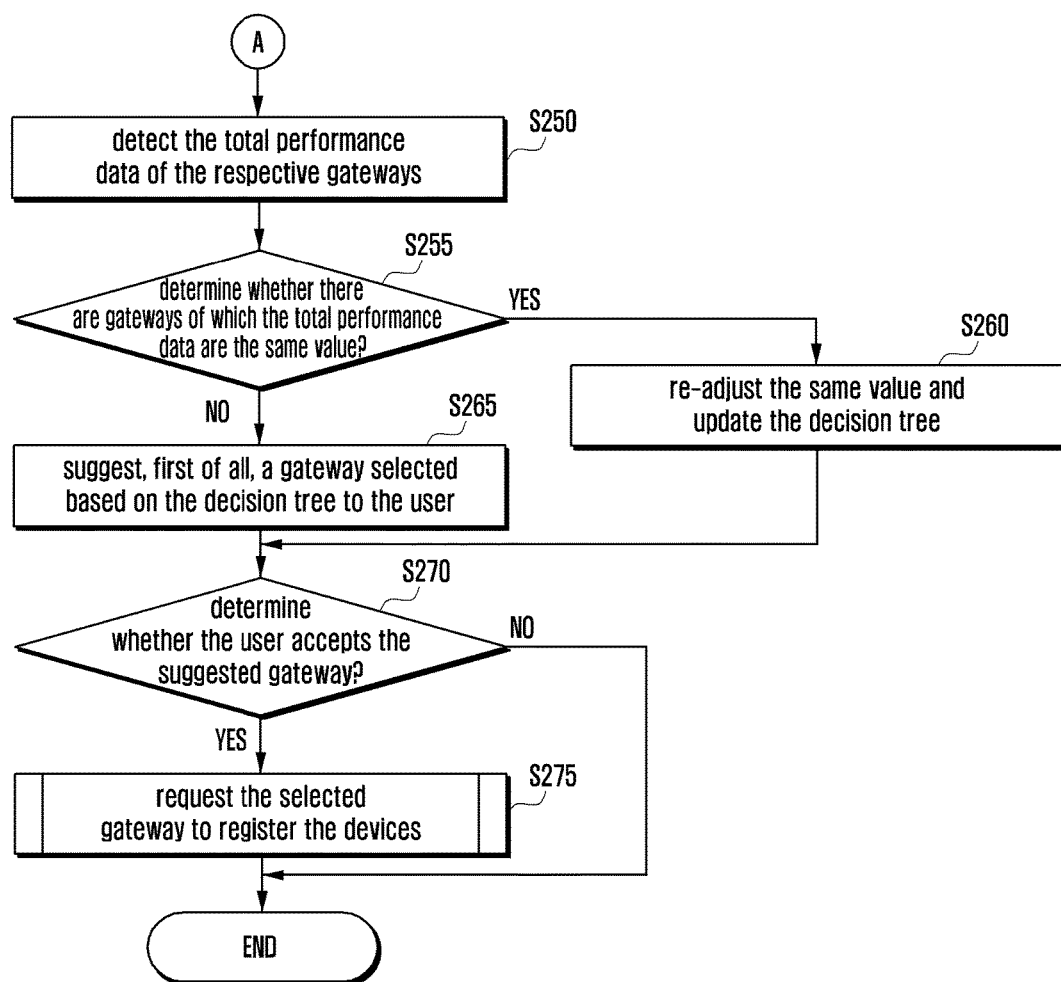

FIGS. 2A and 2B are a flowchart of a method of suggesting a gateway to register devices in a multi-gate environment according to an embodiment of the present invention.

Referring to FIGS. 2A and 2B, the flowchart of FIGS. 2A and 2B describes a process where the master gateway suggests the optimal gateway to register devices, based on performance parameters, according to the first method described above with reference to FIG. 1.

The master gateway selects performance parameters for types of devices to be registered in step S210. The master gateway collects raw data obtained by measurement (called measured raw data) according to the performance parameters from respective gateways in step S215. The raw data may be referred to as first information. The master gateway integrates the collected raw data by respective gateways in step S220, and determines whether the integrated raw data is available in step S225.

When the master gateway ascertains that the integrated raw data is not available in step S225, it removes the integrated raw data and allocates 0 point to normalized data in step S230. On the contrary, when the master gateway ascertains that the integrated raw data is available in step S225, it normalizes the integrated raw data in step 235. The master gateway stores the data normalized in steps S230 and 235 in step S240. The master gateway creates a decision tree based on the normalized data in step S245. The decision tree is made to create the entire performance data used to suggest a gateway to register devices. The gateway for which the total performance data is highest is selected as a gateway to be suggested. The total performance data may be referred to as second data.

The decision tree is created as follows. The normalized data is summed by reflecting weights according to the selected parameters to create the total performance data by respective gateways. The weights represent values allocated by performance parameters by types of devices, and are determined according to the initial set value that has been currently set. The more important the performance parameters are by types of devices when devices are registered in a gateway and then run, the larger the initial set value is. The initial set value may be determined by manufacturers or based on domain knowledge or research of experts. The total performance data are compared with each other and a gateway with the highest total performance data is suggested.

The master gateway detects the total performance data of the respective gateways in step S250, and determines whether there are gateways for which the total performance data are the same value in step S255. When the master gateway ascertains that there are gateways for which the total performance data are the same value in step S255, it re-adjusts the value according to a preset rule and updates the decision tree in step S260. When the master gateway ascertains that there are gateways of which the total performance data is identical, it may remove a parameter with the lowest weight or may re-adjust the total performance data considering only a preset number of parameters with high weights. The master gateway suggests, first of all, a gateway selected based on the updated decision tree to the user in step S265. On the contrary, when the master gateway ascertains that there are no gateways of which the total performance data are the same value in step S255, it suggests a gateway selected through the decision tree first of all, without updating the decision tree.

The master gateway determines whether the user accepts the suggested gateway in step S270. When the user accepts the suggested gateway in step S270, the master gateway requests the selected gateway to register the devices in step S275, and then ends the method. On the contrary, when the user has not accepted the suggested gateway in step S270, the master gateway ends the method.

In the following description, step S210 of FIG. 2A is described in greater detail.

Step S210 is a method of selecting a performance parameter to be considered for a type of device identified in a detection operation. Respective gateways detect devices and identify the types. Detected devices are considered with different performance parameters according to characteristics of the types, respectively.

FIG. 3 is a list of performance parameters selected in step S210 of FIG. 2A, by characteristics of types of devices, according to an embodiment of the present invention. Parameters, such as Failure Rate, etc. exist according to domains of types of devices, and the measurement units of the performance parameter values are, as examples, shown in FIG. 3.

The respective gateways detect parameters representing connectivity information and Received Signal Strength Indicator (RSSI) of devices, and determine whether they can process device registration. According to types of devices, one or two performance parameters are additionally selected. These added performance parameters are used to calculate suitability for device registration. The master gateway requests the respective candidate gateways to measure the selected performance parameters.

In the following description, step S215 of FIG. 2A is described in greater detail.

Step S215 is a method of the master gateway to measure and collect performance parameters for parameters selected according to respective gateways. The master gateway collects data obtained as respective candidate gateways measure performance parameters (called measured data) for a preset period of time. When part of the parameters of a certain gateway from among the respective candidate gateways is not measured in a preset period of time, the master gateway ignores the part of the parameters and instead uses data obtained from measurement of other parameters (called measured data).

FIG. 4 illustrates pseudo code of a calculation function executed by a master gateway after collecting data obtained from measurement in step S215 of FIG. 2.

Referring to FIG. 4, the methods for the master gateway to suggest the optimal gateway from step S210 to step S220 vary according to types of devices to be registered in gateways. These methods are described in detail as follows.

A first method suggests a performance parameter based gateway.

When detecting a device (which is referred to as an Internet Protocol device (IP-device)), the master gateway requests candidate gateways to measure performance parameters for the corresponding device and suggests a gateway to register devices to the user, based on the measurement result (e.g., ping time, RSSI, etc.)

A second method suggests a performance parameter based gateway.

When not detecting a device (which is referred to as a non-IP device), the master gateway suggests, to candidate gateways, a gateway to register devices based on performance parameter values, and is capable of collecting data for the corresponding device without measuring the devices (e.g., connectivity, load index, etc.).

Figure 5:
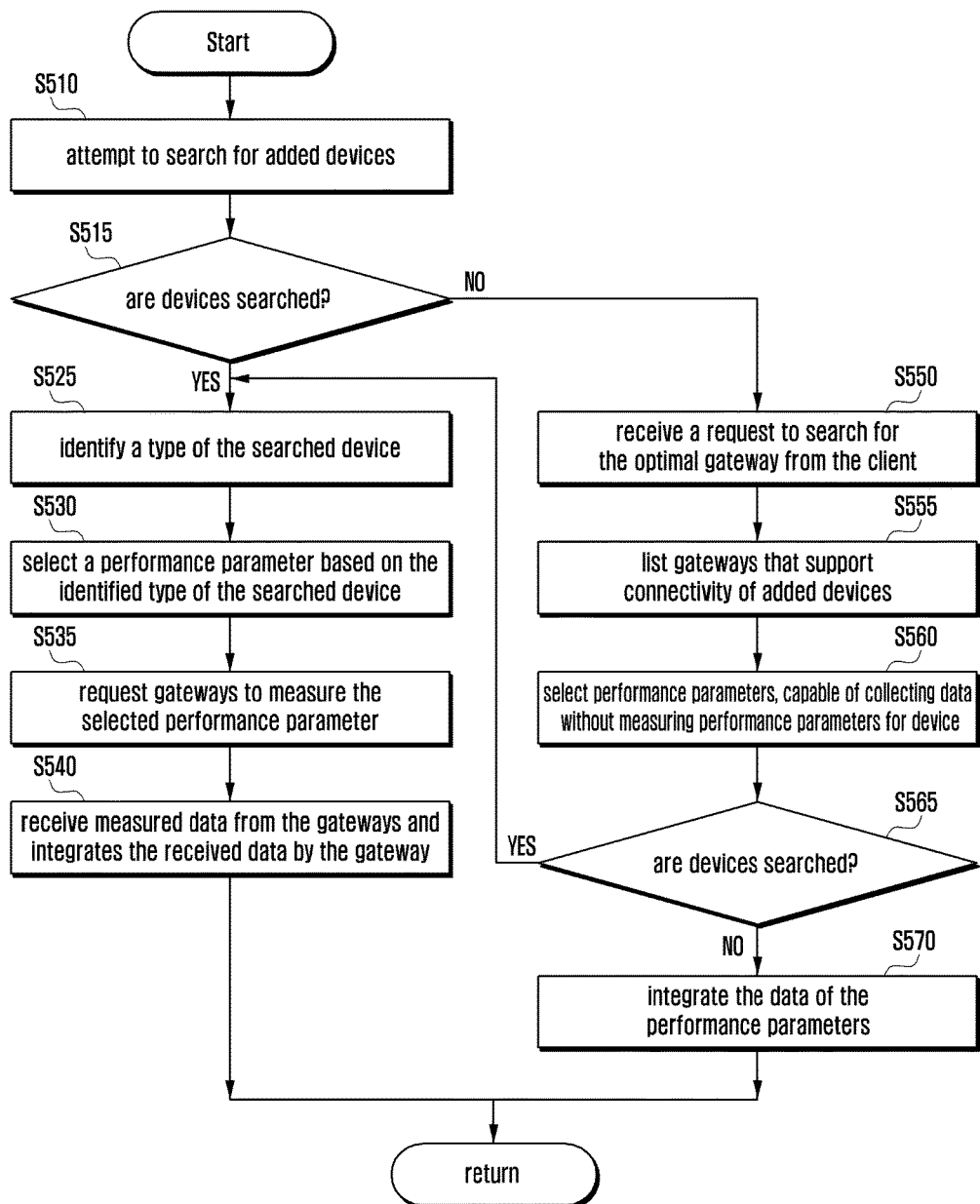
FIG. 5 is a flow chart of steps S210 to S220 of FIG. 2A, in detail, suggesting methods varying according to types of devices, according to an embodiment of the present invention.

FIG. 5 is a flowchart of steps S210 to S220 of FIG. 2A, in greater detail, suggesting methods suggesting a gateway based on performance parameters, according to an embodiment of the present invention.

Referring to FIG. 5, the master gateway allows a plurality of gateways to attempt to search for added devices in step S510. The master gateway determines whether to search for devices through a discovery protocol in step S515. When the master gateway ascertains that devices are searched for through a discovery protocol in step S515, it identifies a type of the searched device in step S525. The master gateway selects a performance parameter based on the identified type of the searched device in step S530. The master gateway requests gateways to measure the selected performance parameter in step S535. The gateways requested for measurement include the master gateway. The master gateway receives data obtained from measurement (called measured data) from the gateways and integrates the received data by the gateways in step S540.

On the contrary, when the master gateway ascertains that devices are not searched for through a discovery protocol in step S515, it receives a request to search for the optimal gateway from the client in step S550. The master gateway lists gateways that support connectivity of added devices in step S555. The gateways listed may include the master gateway. The master gateway selects performance parameters, and is capable of collecting data without measuring performance parameters for a device by the gateways in step S560. The master gateway determines whether the gateways have searched for devices in step S565.

When the master gateway ascertains that the gateways have searched for a device in step S565, the method proceeds to step S525 and identifies a type of the searched device. Then, the master gateway selects a performance parameter based on the identified type of the searched device in step S530. The master gateway requests gateways to measure the selected performance parameter in step S535. The gateways requested for measurement include the master gateway. The master gateway receives data obtained from measurement (called measured data) from the gateways and integrates the received data by the gateways in step S540.

On the contrary, when the master gateway ascertains that the gateways have not searched for a device in operation S565, the method integrates the performance parameter data by the gateways, selected in step S560, in step S570.

Figure 6A:
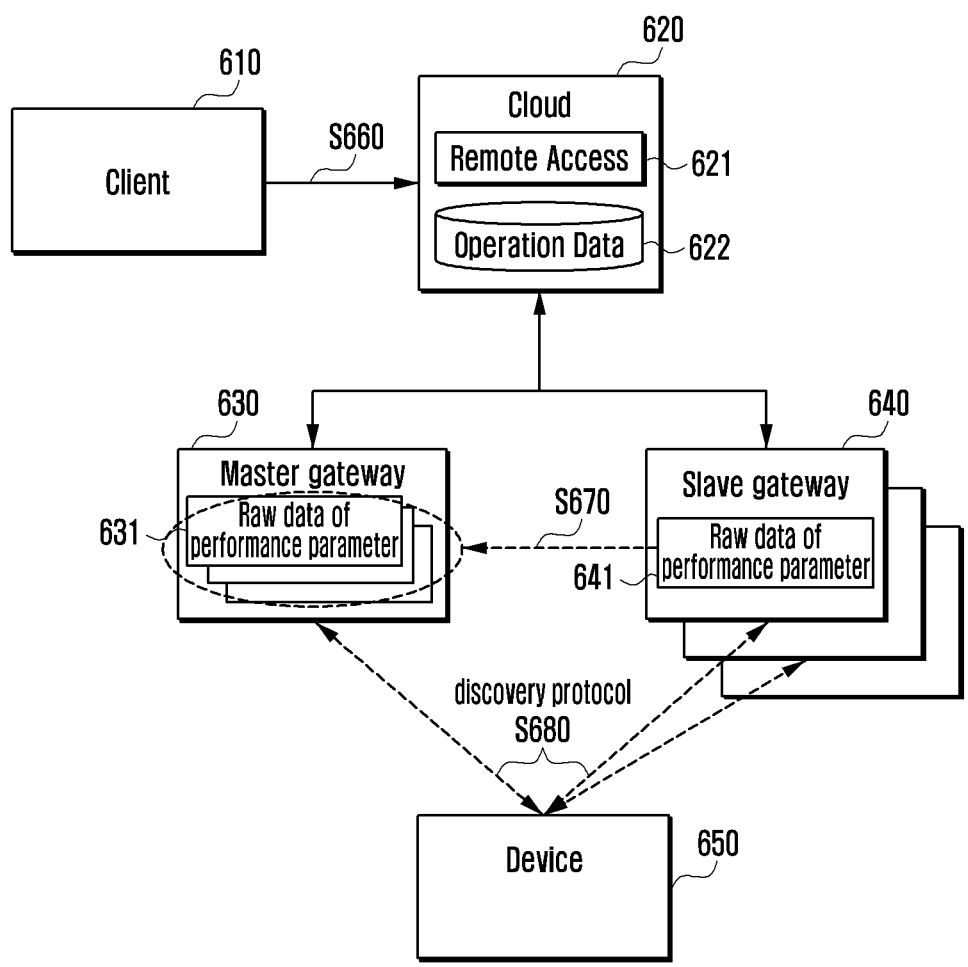
FIGS. 6A and 6B are block diagrams of steps S210 to S220 of FIG. 2A, in detail, based on types of devices, according to an embodiment of the present invention.
Figure 6B:
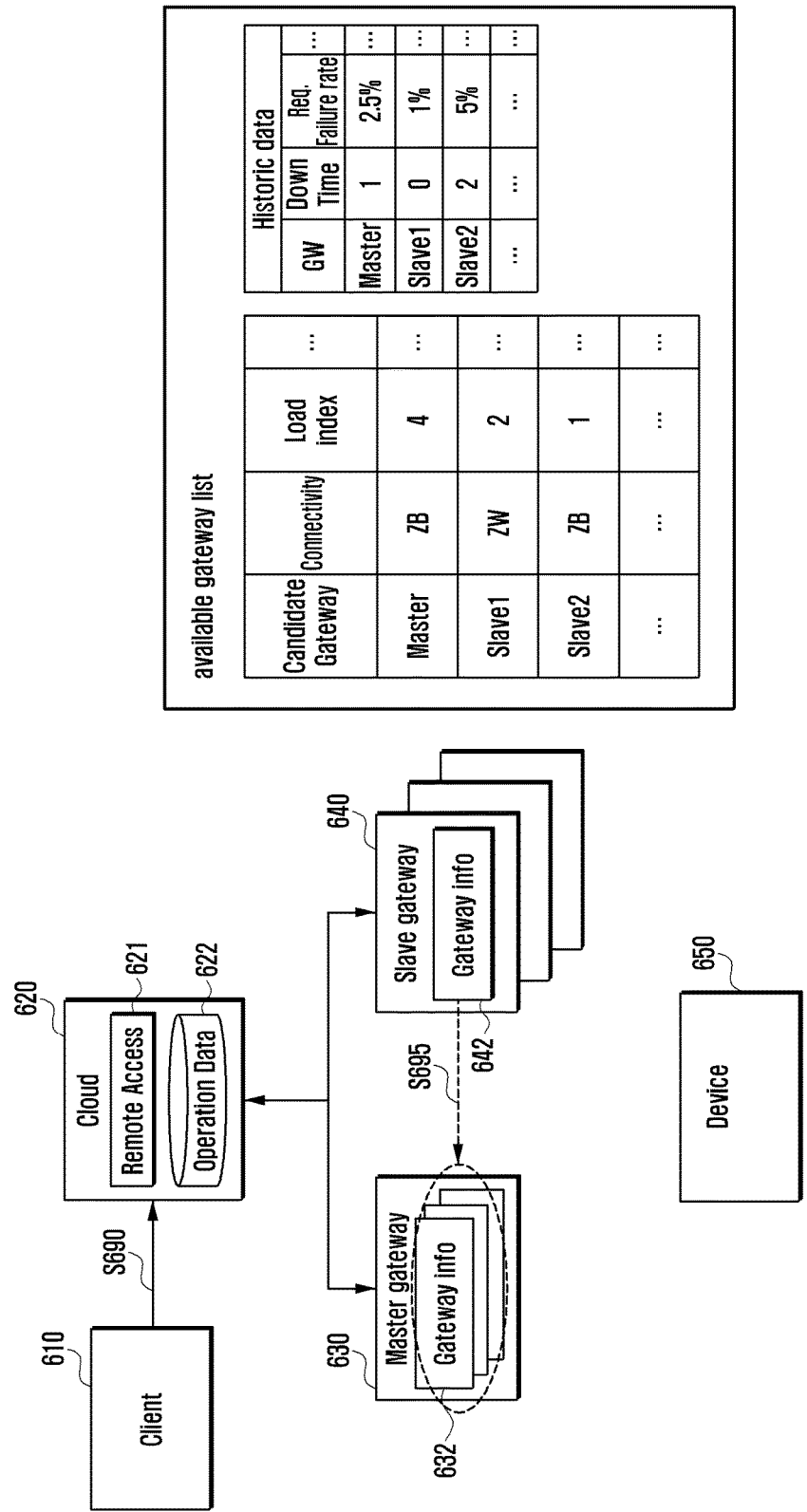

FIGS. 6A and 6B are block diagrams of steps S210 to S220 of FIG. 2A, in greater detail, based on a method of suggesting a gateway based on performance parameters, according to an embodiment of the present invention. FIG. 6A is a block diagram of a method when a device to be registered in a gateway is an Internet Protocol (IP) device, and FIG. 6B is a block diagram of a method when a device to be registered in a gateway is a non-IP device.

Referring to FIG. 6A, FIG. 6A is a block diagram that describes a method for a master gateway to suggest an optimal gateway to register an IP device based on performance parameter according to an embodiment of the present invention.

When a new device 650 is added, the client 610 requests the cloud 620 to search for the device 650 in step S660 or the added device 650 is discovered by a plurality of gateways 630 and 640 through a discovery protocol in step S680. The master gateway 630 identifies a type of the device 650 and selects additional parameters for the identified type of the device 650 (e.g., RSSI, ping time, load index, availability, etc.). The respective gateways 630 and 640 measure performance parameters for the discovered device 650 and obtain the measured data. In order to increase the precision of the data, the measurement may be repeated several times and an average, a maximum and a minimum may be calculated from the measured results. The master gateway 630 collects and integrates the measured performance parameter values from the gateways 630 and 640 and suggests the optimal gateway.

FIG. 6B is a block diagram of a method for a master gateway to suggest an optimal gateway to register a non-IP device based on performance parameter according to an embodiment of the present invention.

Referring to FIG. 6B, although a new device 650 is added, it may not be discovered before registration. This corresponds to a case where a discovery protocol does not exist (e.g., non-IP device, Zigbee, ZWave, Bluetooth, etc.). Before the client 610 registers the device 650, it requests information about the optimal gateway to register the device 650 from the master gateway 630 through the cloud 620 in step S690. The master gateway 630 has managed gateway information 632 and 642, such as performance parameter data about the gateways 630 and 640 (e.g., load index, connectivity, etc.).

In the following description, a list of available gateways shown in FIG. 6B is explained in detail.

The master gateway 630 lists all gateways that support connectivity of the device 650. The master gateway 630 integrates data items of performance parameters that can be collected without the measurement of the device 650, such as connectivity and load index (e.g., the number of devices registered in the gateway) in step S695, compares the data items, and suggests the optimal gateway to register the device 650.

When a device 650 to be registered is a type of Zigbee in the list of available gateways shown in FIG. 6B, the master gateway and "Slave2" gateway have Zigbee connectivity, assuming that "Slave2" gateway has the least load. In this case, considering the two parameters, the optimal gateway is "Slave2" gateway.

In addition, other examples of parameters to be considered are down time of the gateway (which is a time during which the system is unavailable; a state where the system is turned off or is not available; in this case, the master gateway must notify all slave gateways of "power on" or "power off") and failure rate of a client's requested packets (which occurs due to network connection failure or gateway failure). Considering the parameters, the master gateway 630 may determine and suggest the optimal gateway. In an embodiment of the present invention, the two parameters are managed as historic data that occur during the method. When the device 650 may be searched for before registration, the parameters may be measured along with the other parameters and used to determine the optimal gateway.

In the following description, step S235 in FIG. 2A is described in greater detail.

Step S235 is a method of normalizing the raw data obtained from the measurement of performance parameters.

The normalization is to convert the measured, raw data of respective performance parameters into values within a range from 0 to 100. The normalization is performed considering characteristics of the respective performance parameters. In the normalization, normalized data is calculated according to mathematical expressions considering the characteristics of the respective performance parameters. The normalization allows easy integration and comparison of raw data of respective performance parameters that differ from each other in unit and range.

FIGS. 7A to 7G are graphs of mathematical expressions for normalizing measurement values of performance parameters in step S235 of FIG. 2A, according to an embodiment of the present invention.

Figure 7A:
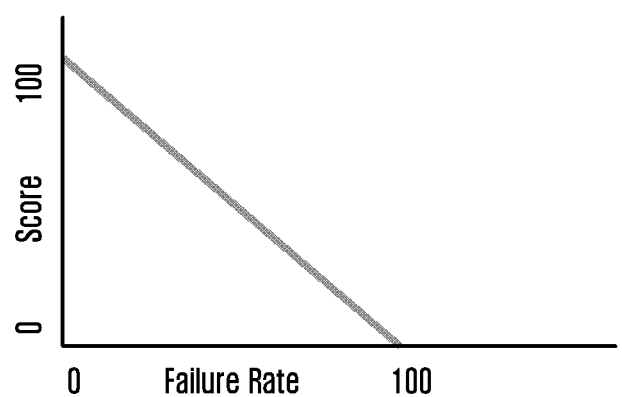
FIGS. 7A to 7G are graphs of mathematical expressions for normalizing measurement values of performance parameters in step S235 of FIG. 2A, according to an embodiment of the present invention.

FIG. 7A is a graph of Failure Rate according to an embodiment of the present invention. It is assumed that the parameter measurement values of Failure Rate are obtained as data in a unit of percentage (%) (e.g., the Failure Rate of Gateway 1 is 20%). Since the lower the failure rate the more favorable the gateway is, normalized data must be a relatively large value. The normalization for the graph as shown in FIG. 7A is derived from the following Equation (1).

$$\text{Normalized Score} = 100 - \text{FailureRate (\%)} \quad (1)$$

Figure 7B:
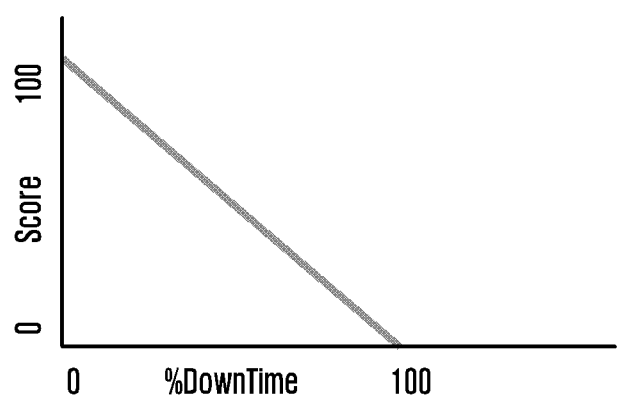

FIG. 7B is a graph of Down Time (e.g. a time during which a system is unavailable). It is assumed that the parameter measurement values of Down Time are obtained in a unit of percentage (%) (e.g., the down time of Gateway 1 is 30% of the total time). Since the shorter the down time the more favorable the gateway is, normalized data must be a relatively large value. The normalization for the graph shown in FIG. 7B is derived from the following Equation (2).

$$\text{Normalized Score} = 100 - \text{DownTime (\%)} \quad (2)$$

Figure 7C:
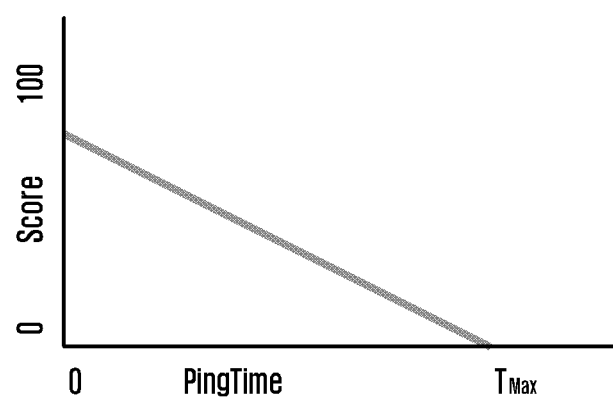

FIG. 7C is a graph of "Ping Time." It is assumed that the parameter measurement values of "Ping Time" are obtained in millisecond (ms) (e.g., the Ping Time of Gateway 1 is 0.4 ms). Since the shorter the ping time the more favorable the gateway is, normalized data must be a relatively large value. The normalization for the graph shown in FIG. 7C is derived from the following Equation (3).

$$\text{Normalized Score} = 100 * (T\text{max} - \text{PingTime}) / T\text{max} \quad (3)$$

Tmax is the maximum available Ping Time and is set as the initial value set by the manufacturer. Tmax may be periodically updated (e.g., Tmax is updated once a month and is calculated as following, Tmax={the average of all ping times measured in the last month}×2). Tmax is corrected according to network environments. When a network rate of a system is detected as it decreases, Tmax is increased. An increase in Tmax may also be reflected in the normalized value.

Figure 7D:
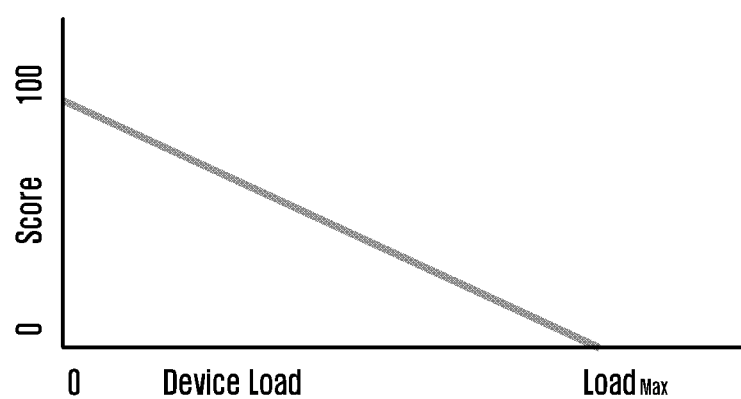
Figure 7E:
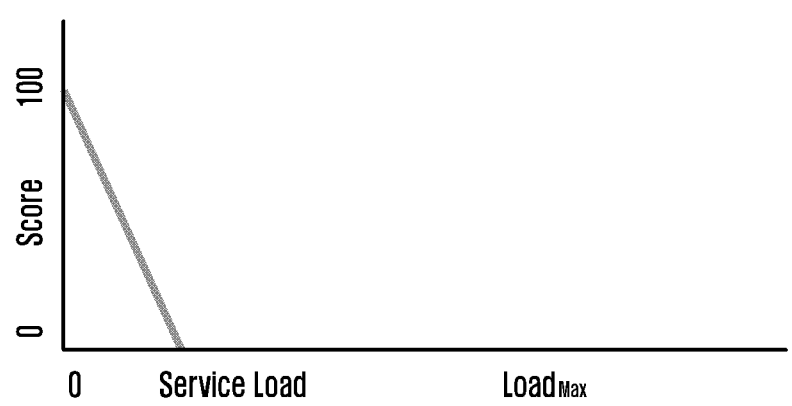

FIGS. 7D and 7E are graphs of Load Index. Load Index is divided into Device Load and Service Load.

FIG. 7D is a graph of Device Load, representing the number of devices registered. It is assumed that the parameter measurement values are obtained as integers, e.g., 0≤DevLoadIndex<DevLoadmax, where DevLoadIndex is the Load Index of the device and DevLoadmax is the maximum available Load Index of the device. This value is set to the initial value set by the manufacturer.

Since the lower the Load Index of the device the more favorable the gateway is, normalized data must be a relatively large value. The normalization for the graph shown in FIG. 7D is derived from the following Equation (4).

$$\text{Normalized Score} = 100 * (\text{DevLoadmax} - \text{DevLoadIndex}) / \text{DevLoadmax} \quad (4)$$

FIG. 7E is a graph of Service Load, representing the number of services currently activated in a gateway. This value is calculated according to footprints of service-related elements as follows:

a. the average usage and maximum usage of CPU;
b. the average usage and maximum usage of memory;
c. the packet reception rate per hour (e.g., 20 packets per hour); and
d. the average packet processing time.

The items "a" and "b" may be calculated by a method similar to the hardware specification. Since the lower the Service Load Index the more favorable the gateway is, normalized data must be a relatively large value. The normalization for the graph shown in FIG. 7E is derived as the following Equation (5).

$$\text{Normalized Score} = 100 * (\text{SvcLoadmax} - \text{SvcLoadIndex}) / \text{SvcLoadIndex} \quad (5)$$

SvcLoadIndex is Service Load Index and SvcLoadmax is the maximum available Service Load Index. This value is set to the initial value of the manufacture.

Figure 7F:
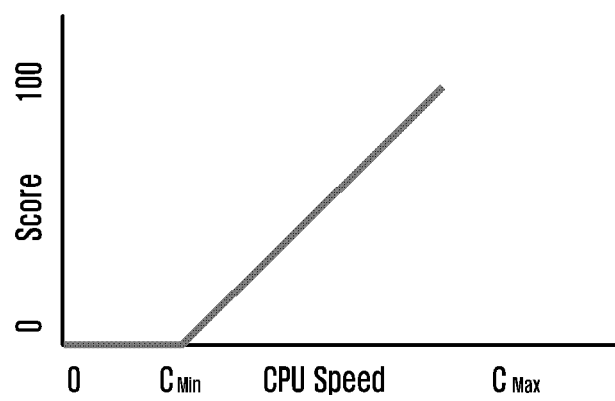
Figure 7G:
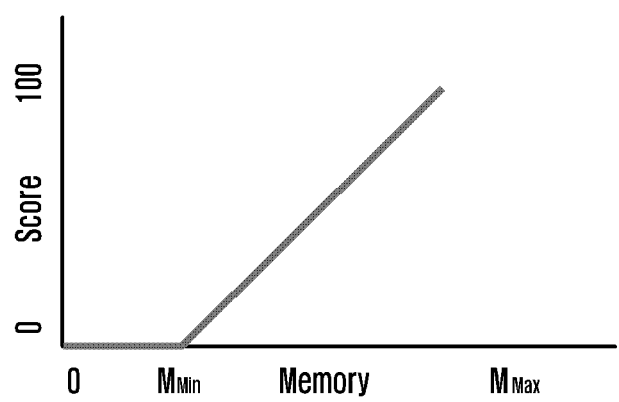

FIGS. 7F and 7G are graphs of hardware specification. Hardware specification is obtained by measuring the speed of a CPU and a memory. It is assumed that the parameter measurement value of the CPU speed is obtained in Megahertz (MHz) and the parameter measurement value of the memory is obtained in Megabytes (Mbytes).

When the first gateway is set and added to a master gateway, the master gateway collects and stores the hardware specification of the gateway. The greater the hardware specification of a gateway the greater the amount of data of the hardware specification. Therefore, when a new gateway has a greater hardware specification than existing gateways, the value of the new gateway is set to 100 and the values of the existing gateways will be altered. Since the greater the hardware specification the more favorable the gateway is, normalized data must be a relatively large value. The normalization for the graph shown in FIGS. 7F and 7G is derived from the following Equations (6) and (7).

Normalization expression based on CPU speed $$\text{Normalized Score} = 0 (\text{for } CpuSpeed < C\text{min}) \quad (6)$$
$$= 100 * (CpuSpeed - C\text{min}) / (C\text{max} - C\text{min})$$

CpuSpeed is the CPU speed and Cmin is the minimum allowable value so that a gateway can run. This value is set to the initial value set by the manufacturer. The CPU speed is measured in Megahertz (MHz).

Normalization expression based on memory $$\text{Normalized Score} = 0 (\text{for } Memory < M\text{min}) \quad (7)$$
$$= 100 * (Memory - M\text{min}) / (M\text{max} - M\text{min})$$

Memory is the memory value and Mmin is the minimum allowable value so that a gateway can run. This value is set to the initial value set by the manufacturer.

In the following description, steps S245 to S265 are described in greater detail.

Steps S245 to S265 are a method for creating a decision tree and calculating the order to suggest the optimal gateway.

Figure 8:
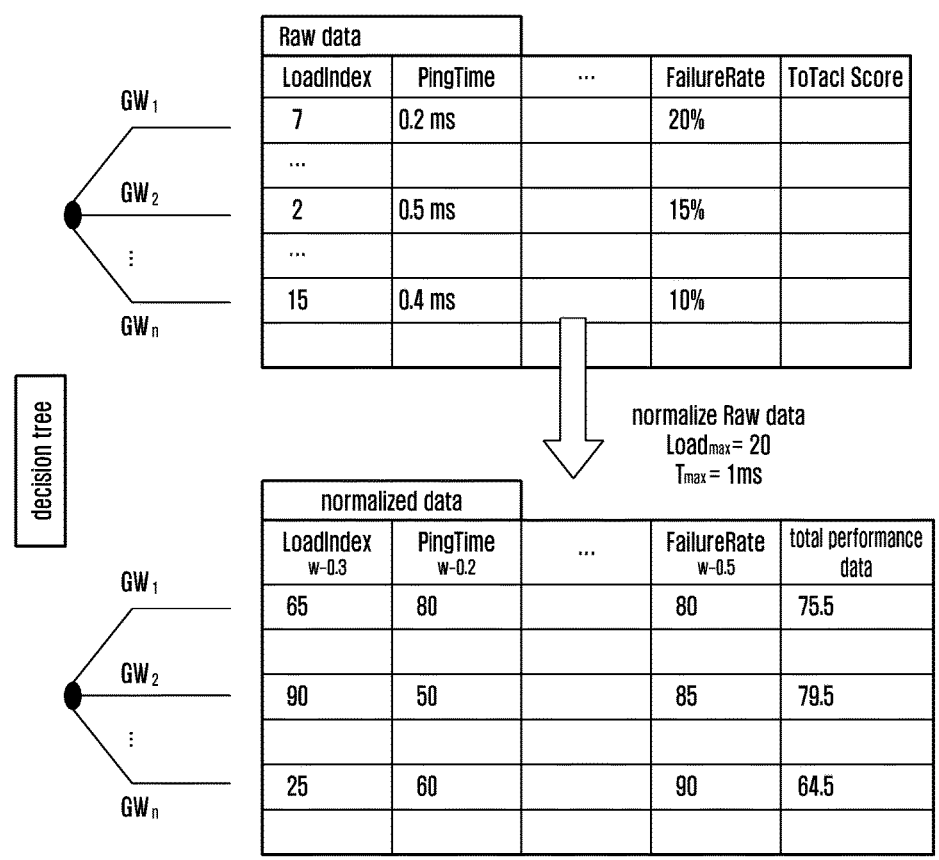
FIG. 8 is a decision tree for selecting an optimal gateway according to an embodiment of the present invention.

FIG. 8 is a decision tree for suggesting the optimal gateway according to an embodiment of the present invention. The master gateway creates a decision tree based on normalized data calculated from raw data of performance parameters measured by respective gateways. The decision tree is made to create the total performance data used to suggest a gateway to register the device. A gateway of which the total performance data is the highest is selected as a gateway to be suggested.

Referring to FIG. 8, the decision tree is constructed as follows. Data values normalized by the equations described above are summed, based on weights according to the selected performance parameter, thereby creating the total performance data by respective gateways.

FIG. 9 shows weights that are allocated to performance parameters and to device types according to an embodiment of the present invention.

When there are N selected parameters 1-$P_n$ (n and N are positive integers), the parameters 1-$P_n$ are allocated with weights $Wp_1$-$Wp_n$, respectively. In one gateway, the summation of all the weights $Wp_i$ is one, which is expressed by the following Equation (8).

$$\sum_{i=1}^{n} w_{P_i} = 1 \quad (8)$$

The weight is set according to the initial set value that has been currently set. The more important the performance parameters by types of devices are when devices are registered in a gateway and then run, the larger the intitial set value is. The initial set value may be determined by manufacturers or based on domain knowledge or empirical data. The total performance data is derived by the following Equation (9).

Values of parameters (weight>0) measured from respective gateways.

$$S_k = \sum_{i=1}^{n} w_{P_i} * (Sk)_{(P_i)} \quad (9)$$

In Equation (9) above, gateway k is the $k^{th}$ gateway; $S_k$ is the total performance data of gateway k; $P_i$ is the $i^{th}$ parameter of gateway k; $(S_k)_{(Pi)}$ is a normalized value of $P_i$; and $W_{Pi}$ is the weight of $P_i$. The total performance data $S_k$ is the summation of the values of multiplying $Wp_i$ and $(S_k)_{(Pi)}$. The respective gateways are prioritized based on the total performance data $S_k$ and arranged in descending order. In this case, a gateway with the highest value of the total performance data as the highest order of priority is determined as the optimal gateway.

When there are gateways that have the same total performance data, the total performance data of the gateways is re-calculated by one of the following two re-calculation methods. This may also be applied to step S260, i.e., the operation of a multi-gate.

The first re-calculation method is removal of a parameter with a low weight.

The second re-calculation method is addition of a parameter with a high weight.

The first re-calculation method is a method of removing a parameter with a low weight. The $j^{th}$ parameter with the lowest weight is excluded from among the selected N parameters (0<j≤N) and then the performance data is recalculated by using the remaining parameters. Then, when the same data still exists, the (j–1)$^{th}$ parameter with the next lowest weight is excluded and then the performance data is recalculated by using the remaining parameters. This process repeats until one parameter is left. However, when the same data still exists, the corresponding gateways are regarded as gateways with the same performance.

The second re-calculation method is a method of recalculating performance data by using the $j^{th}$ parameter with the highest weight from among the selected N parameters (0<j≤N). When the same data exists, the (j–1)$^{th}$ parameter with the next highest weight is added and then the performance data is recalculated. This process repeats until the $N^{th}$ parameter is left. However, when the same data still exists, the corresponding gateways are regarded as gateways with the same performance.

In the following description, step S275 of FIG. 2 is described in detail where the master gateway according to an embodiment of the present invention suggests the optimal gateway to register devices and registers the devices in the optimal gateway.

Figure 10A:
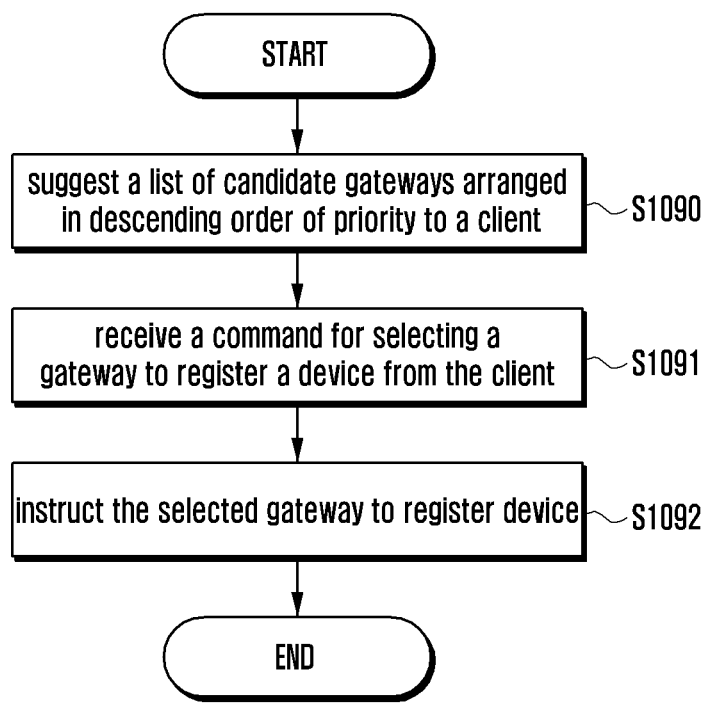
FIG. 10A is a flowchart of step S275 of FIG. 2B, in detail, according to an embodiment of the present invention.
Figure 10B:
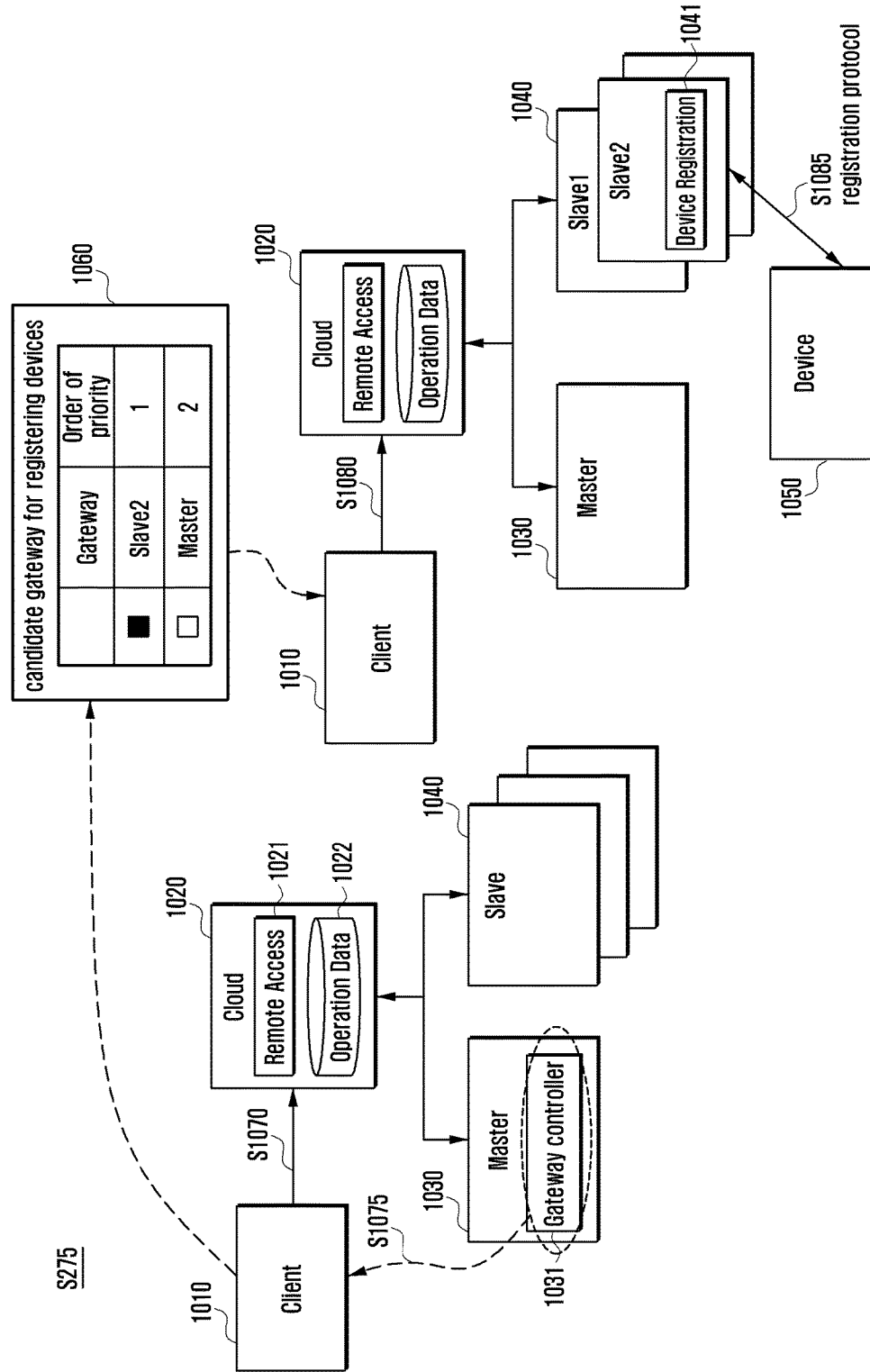
FIG. 10B is a block diagram that of steps S275 of FIG. 2B, in detail, according to an embodiment of the present invention.

FIG. 10A is a flowchart of step S275 of FIG. 2B and FIG. 10B is a block diagram of the method of FIG. 10A.

Referring to FIG. 10A, the master gateway determines the order of priority by the total performance data $S_k$ and suggests a list of candidate gateways arranged in descending order of priority to a client in step S1090. The master gateway receives a command for selecting a gateway to register a device from the client in step S1091. The master gateway instructs the selected gateway to register the device in step S1092.

Referring to FIG. 10B, the client 1010 requests information about a candidate gateway to register a device 1050 from the master gateway 1030 in step S1070. The master gateway 1030 transmits, to the client 1010, a list of candidate gateways of which order of priorities are determined based on the total performance data of gateways and that are arranged in descending order of priority in step S1075. The client 1010 selects one of the gateways on the gateway list 1060 that will register the device.

The following description is provided for a case where the gateway selected by the client 1010 differs from the optimal gateway. Since a corresponding gateway is selected by the client 1010, the device is registered in the selected gateway. Then, the registration of a device is automatically adjusted according to a periodic background process set to the client 1010. This procedure will be described in greater detail below referring to FIG. 15.

The selected gateway performs registration in 1041 and management of a real device by registration protocol in step S1085. According to device types, this operation may further include a paring process for the client 1010 to press a physical button of the device and to pair the device with the gateway.

Figure 11A:
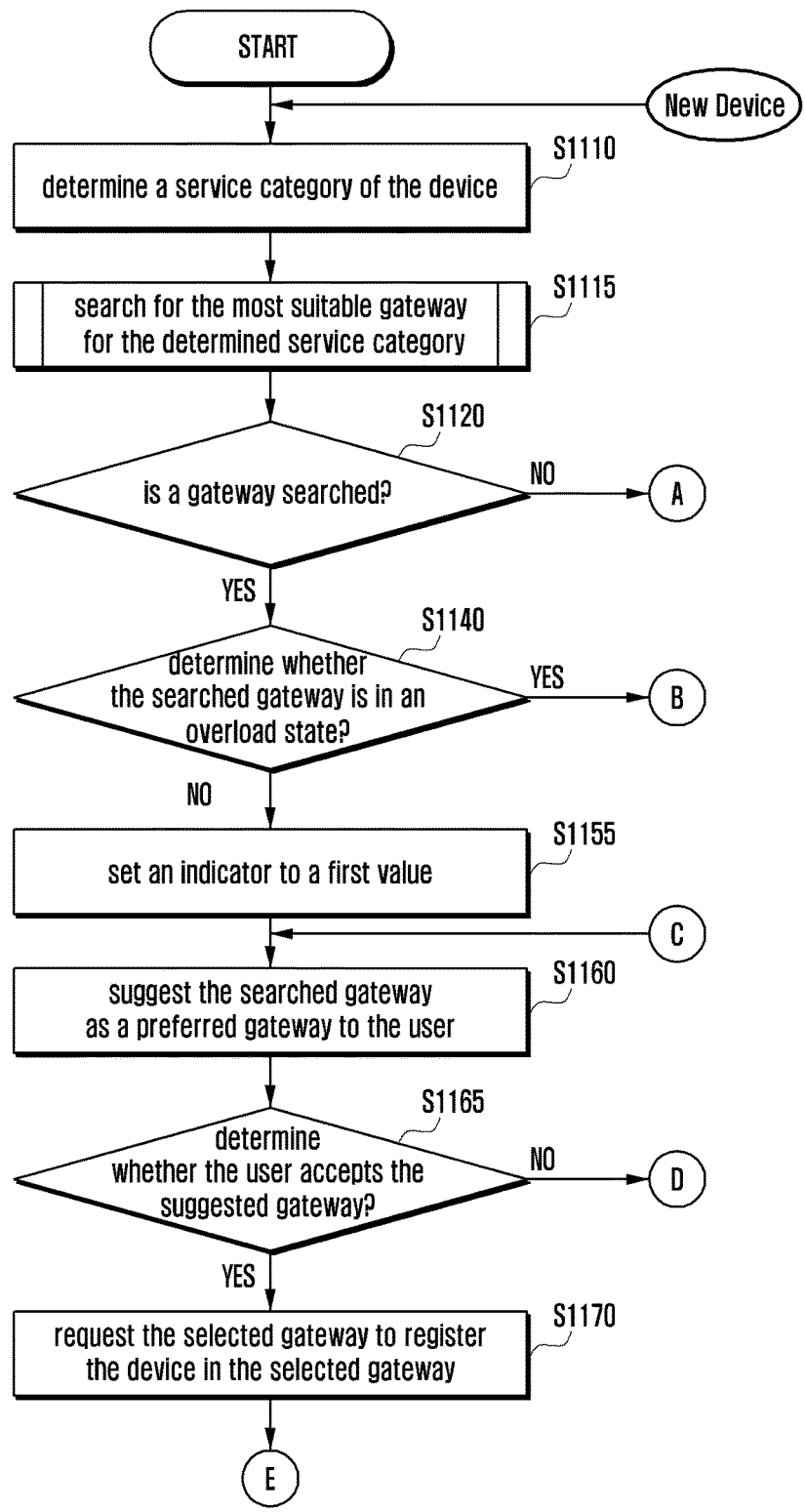
FIGS. 11A and 11B are a flowchart of a method of suggesting a gateway to register devices in a multi-gate environment according to an embodiment of the present invention.
Figure 11B:
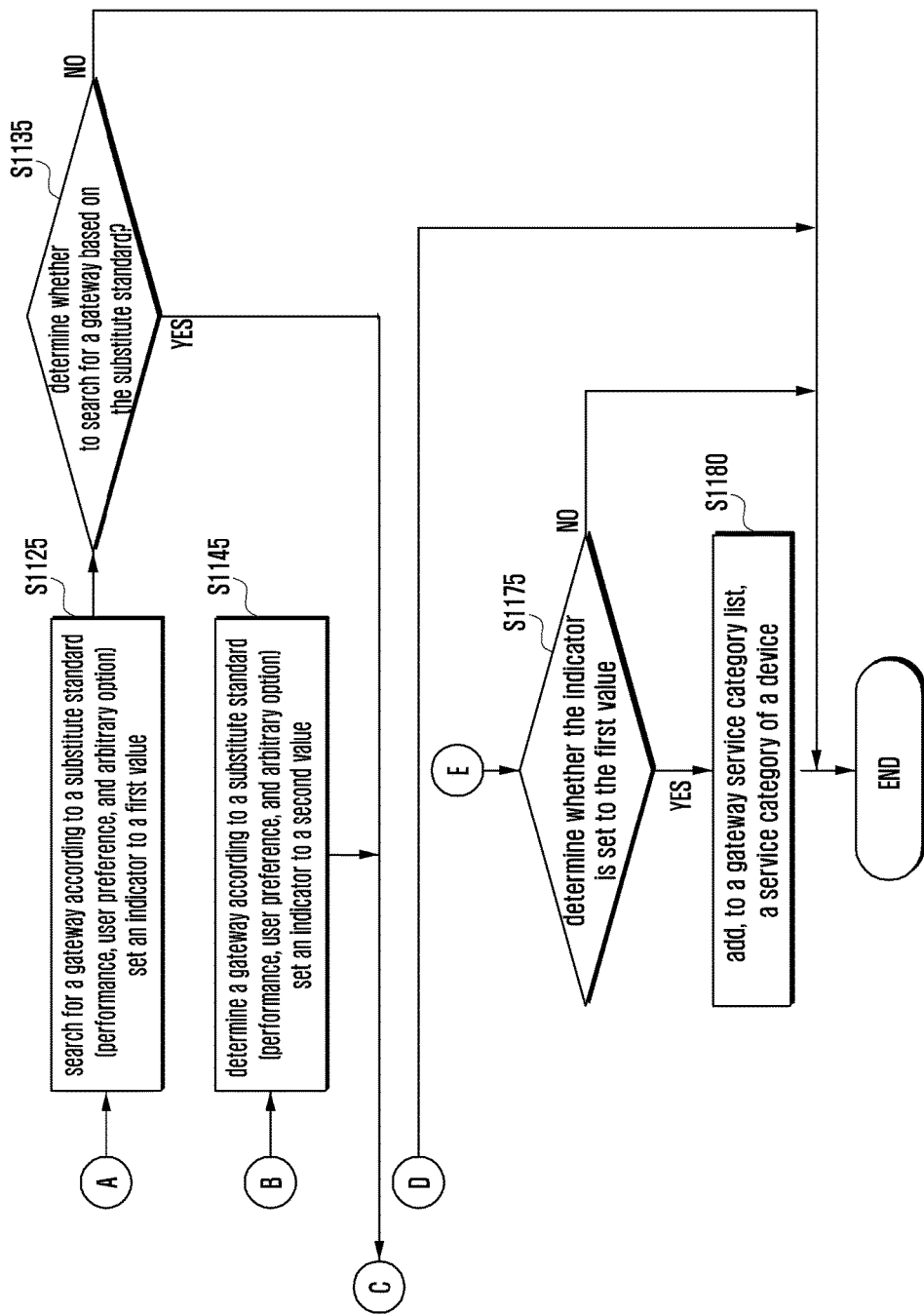

FIGS. 11A and 11B are a flowchart of a method of suggesting a gateway to register devices in a multi-gate environment according to an embodiment of the present invention.

FIGS. 11A and 11B are related to the second method for a master gateway to suggest the optimal gateway to register a device based on service categories of a device described above with reference to FIG. 1.

When a new device is added, the master gateway identifies a type of the added device and determines a service category of the device in step S1110. The master gateway searches for a gateway that has the determined service category in step S1115. The master gateway determines whether to search for a gateway in step S1120.

When the master gateway ascertains that a gateway has not been searched in step S1120, it searches for a gateway according to a substitute standard in step S1125 in FIG. 11B, and sets an indicator to a first value. The substitute standard refers to a condition used to search for a gateway when the master gateway has not searched for the optimal gateway to register a device based on a service category. Examples of the substitute standard are performance, user preference, arbitrary option, etc.

Then, the master gateway determines whether to search for a gateway based on the substitute standard in step S1135. When the master gateway ascertains that a gateway has been searched in step S1135, it suggests the searched gateway as a preferred gateway to the user, first of all in step S1160 in FIG. 11A. The master gateway determines whether the user accepts the suggested gateway in step S1165. When the master gateway ascertains that the user has accepted the suggested gateway in step S1165, it requests the selected gateway to register the device in the selected gateway in step S1170. Then, the master gateway determines whether the indicator is set to the first value in step S1175 in FIG. 11B. When the master gateway ascertains that the indicator is set to the first value in step S1175, it adds, to a gateway service category list, a service category of a device to be added in step S1180, and then ends the method. On the contrary, when the master gateway ascertains that the indicator is not set to the first value but to a second value in step S1175, it ends the method without adding a service category to the gateway service category list.

In addition, when the master gateway ascertains that a gateway has not been searched based on the substitute standard in step S1135, it ends the gateway suggesting method. Furthermore, when the master gateway ascertains that the user has not accepted the suggested gateway in step S1165 in FIG. 11A, it ends the gateway suggesting method.

Moreover, when the master gateway ascertains that a gateway has been searched in step S1120, it determines whether the searched gateway is in an overload state in step S1140. When the searched gateway is in an overload state in step S1140, the master gateway selects a gateway according to the substitute standard (e.g., performance, user preference, arbitrary option, etc.) in step S1145, and sets the indicator to the second value. The master gateway suggests the searched gateway as a preferred gateway to the user, first of all in step S1160. The master gateway determines whether the user accepts the suggested gateway in step S1165. When the master gateway ascertains that the user has accepted the suggested gateway in step S1165, it requests the selected gateway to register the device in the selected gateway in step S1170. Then, the master gateway determines whether the indicator is set to the first value in step S1175 in FIG. 11B. Since the indicator has been set to the first value in step S1155 in FIG. 11A, the master gateway concludes that the indicator is set to the second value in step S1175 in FIG. 11B and ends the method without adding, to the gateway service category list, a service category of a device to be registered.

That is, the indicator serves as a threshold to determine whether a service category of a device to be added is added to a list of gateway service categories. When a gateway is searched according to a substitute standard as described above in step S1125, a service category of a device is added to the searched gateway. In contrast, although a gateway has been searched, when another gateway is searched according to a substitute standard because the searched gateway is in an overload state as described above in step S1145, a service category of a device is not added to the searched gateway, which is because the process of searching for another gateway is performed by using a substitute standard in order to avoid a temporary overload.

On the contrary, when the searched gateway is not in an overload state in step S1140 in FIG. 11A, the master gateway sets the indicator to the second value in step S1155 and then proceeds to step S1160 and the following steps.

In the following description, step S1115 is described in greater detail.

In step S1115 according to an embodiment of the present invention, a gateway to register a device based on a service category is searched by the following two methods.

A first method is searching for a gateway based on a service category.

In adding a device or making a pair with a device, the master gateway searches for a gateway based on a service category of a device. When the master gateway has not searched for a corresponding gateway, it determines a gateway according to a substitute standard (performance, user preference or arbitrary option).

A second method is searching for a gateway based on a service category.

When gateways have a unit of group, the master gateway sets services to be provided in a unit of group in adding a device or making a pair with a device and searches a corresponding group for a gateway. When the master gateway has not searched for a corresponding gateway, it determines a gateway according to a substitute standard (e.g., performance, user preference or arbitrary option).

Figure 12:
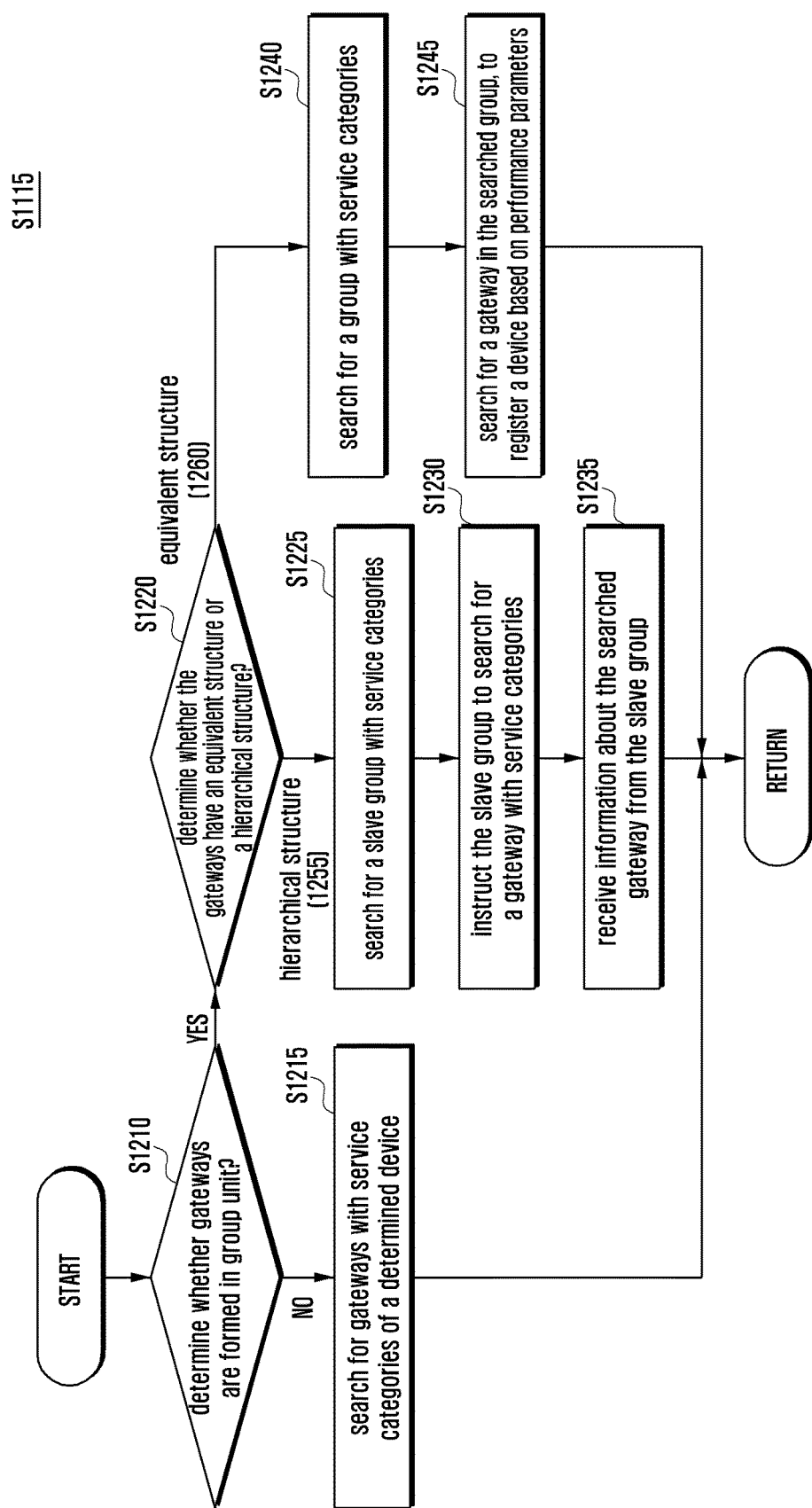
FIG. 12 is a flowchart of step S1115 of FIG. 11, in detail, based on methods of searching for a gateway based on service category, according to an embodiment of the present invention.

FIG. 12 is a flowchart of step S1115 of FIG. 11, in detail, based on methods of searching for a gateway based on service category, according to an embodiment of the present invention.

Referring to FIG. 12, the master gateway determines whether two or more gateways are formed in a group unit in step S1210. When the master gateway ascertains that two or more gateways are not formed in a group unit in step S1210, it searches for gateways with service categories of a determined device, respectively, in step S1215, which corresponds to the first method of searching for a gateway based on a service category.

When the master gateway ascertains that two or more gateways are formed in a group unit in step S1210, it searches for a gateway based on a service category which corresponds to the second method described above.

That is, when the master gateway ascertains that two or more gateways are formed in a group unit in step S1210, it determines whether the gateways have an equivalent structure or a hierarchical structure in step S1220. When the master gateway ascertains that the gateways have a hierarchical structure in step S1220, it searches for a lower slave group with service categories of the determined device in step S1225. The master gateway instructs the slave group to search for a gateway with service categories of the determined device in step S1230. The master gateway receives information about the searched gateway from the slave group in step S1235.

When the master gateway ascertains that the gateways have an equivalent structure in step S1220, it searches for a group with service categories in step S1240. The master gateway searches for a gateway in the searched group, to register a device based on performance parameters in step S1245.

When the master gateway ascertains that the gateways do not have a group structure in step S1210, it searches for the optimal gateway to register below, which is described in detail referring to FIG. 13.

Figure 13:
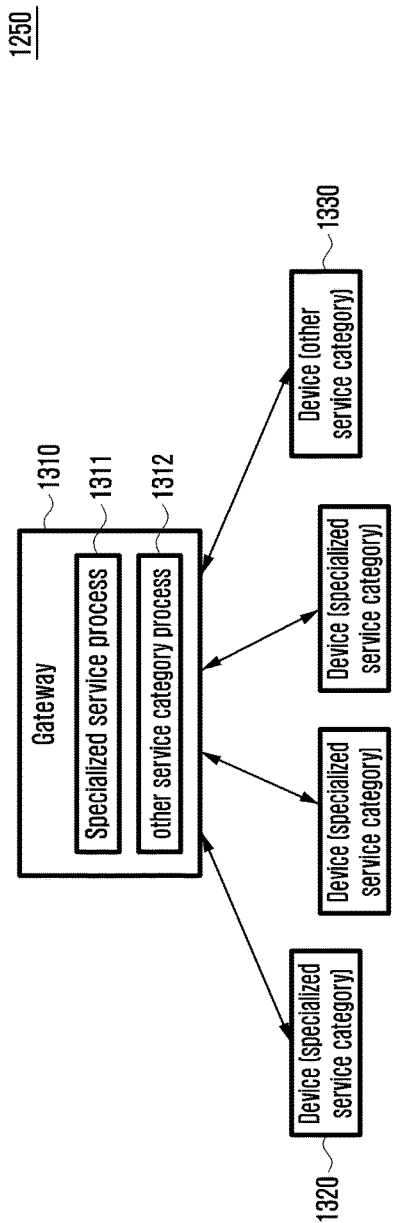
FIG. 13 is block diagram of step S1115 of FIG. 11, in detail, according to an embodiment of the present invention.

FIG. 13 is a block diagram of a method for a master gateway to search for the optimal gateway to register a device when the gateways do not have a group structure in in step S1210 of FIG. 12 which corresponds to the first method of searching for a gateway based on a service category.

Referring to FIG. 13, the master gateway may suggest the optimal gateway 1310 to register a device based on service categories of a device. When a new device 1320 is added or paired, the master gateway identifies a type of the device and selects a service category 1311 suitable for the type of device from the service category list shown in FIG. 13. The service category list includes service categories each of which includes sub-services. Sub-services are associated with corresponding devices, respectively. In order to search for the optimal gateway, the master gateway searches for a gateway with a service category corresponding to an added or paired device.

When the master gateway has not searched for a suitable gateway, it may select a gateway based on a substitute standard. The substitute standard refers to a condition used to search for a gateway when the master gateway has not searched for the optimal gateway to register a device based on a service category. Examples of the substitute standard are performance, user preference, arbitrary option, etc. When the optimal gateway is determined, it is shown to the user, first of all. When the user checks the gateway, the device may be registered in the gateway.

When a device is registered in a gateway selected according to the substitute standard in 1330, the master gateway may allocate a service category of device to the gateway in 1312. In this case, the gateway may execute a specialized process for the added service category of device.

Figure 14A:
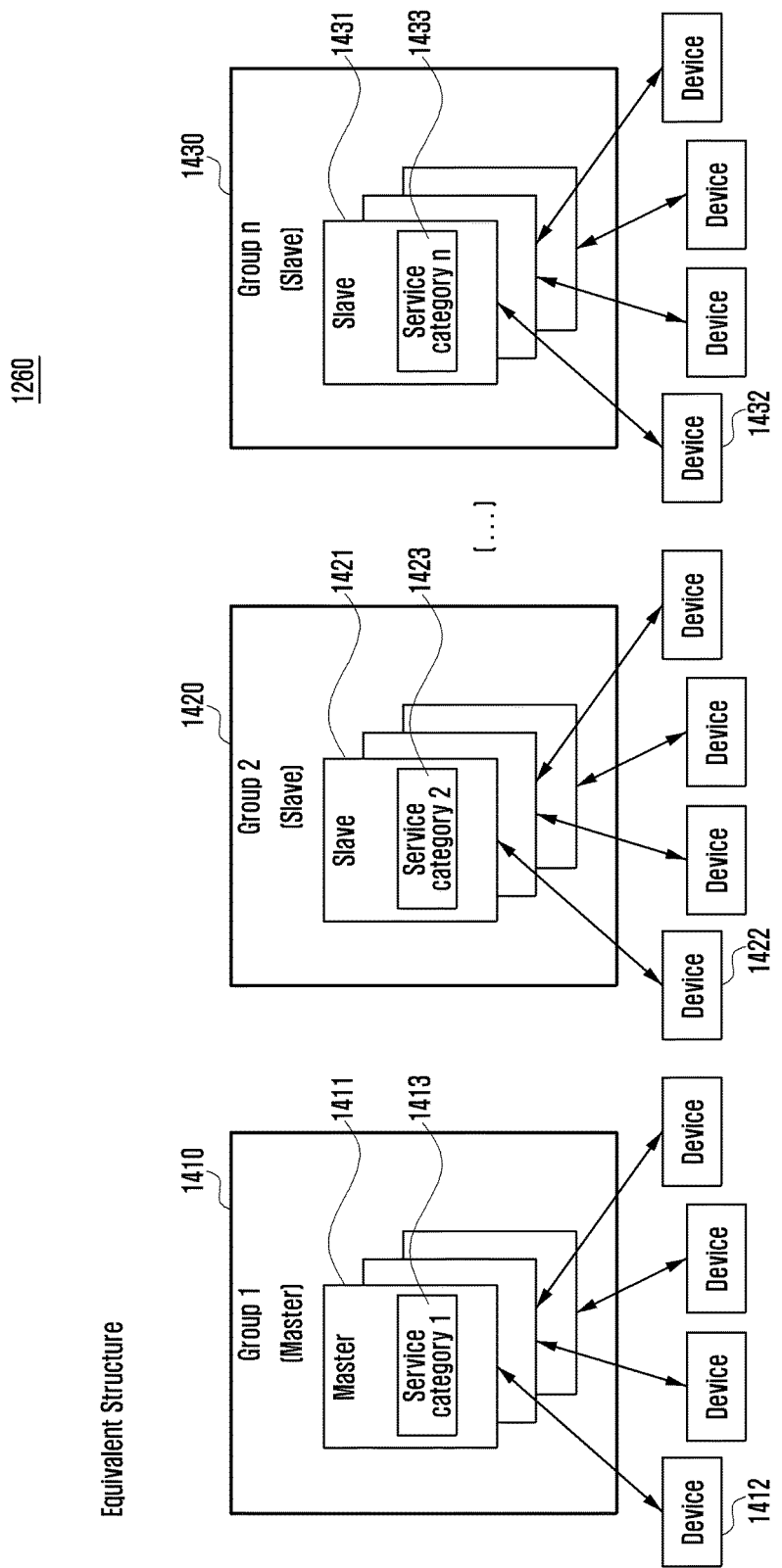
FIGS. 14A and 14B are block diagrams of step S1115 of FIG. 11, in detail, according to an embodiment of the present invention.
Figure 14B:
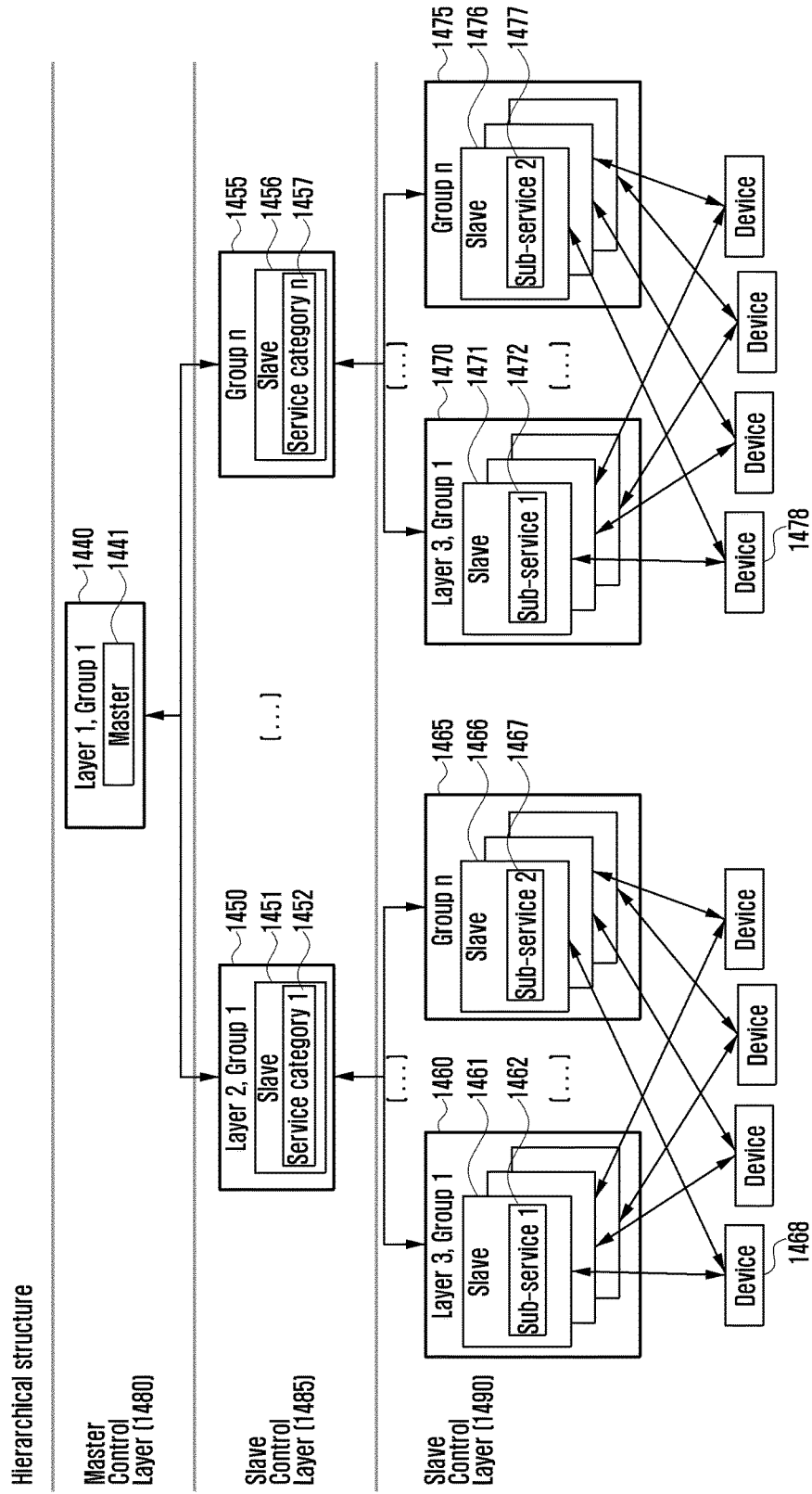

FIGS. 14A and 14B are block diagrams of a method of a master gateway to search for the optimal gateway to register a device based on a service category of device when the gateways have a group structure. This method corresponds to the second method of searching for a gateway based on a service category.

FIG. 14A is a block diagram of a method of a master gateway 1411 to search for an optimal gateway to register a device when two or more gateways are formed in a group unit of equivalent structure.

When two or more gateways are formed in a group unit of equivalent structure, groups 1410, 1420, and 1430 include service categories 1413, 1423, and 1433 respectively. All the gateways 1411, 1421, and 1431 in the groups 1410, 1420, and 1430 may include sub-services of corresponding service categories 1413, 1423, and 1433.

When new devices 1412, 1422, and 1432 are added, the master gateway 1411 identifies service categories suitable for the devices and determines groups with the service categories. The master gateway searches for the optimal gateway based on performance parameters in each group.

When the master gateway 1411 has searched for a gateway and has not detected a group with a corresponding service category, it selects another gateway or creates a new group based on a substitute standard to add a service category of a device.

FIG. 14B is a block diagram of a method of a master gateway 1441 to search for the optimal gateway to register a device when two or more gateways are formed in a group unit of a hierarchical structure.

When two or more gateways are formed in a group unit of a hierarchical structure, the master control layer 1480 manages all the groups 1450 and 1455 in the lower slave control layer 1485. The groups 1450 and 1455 have service categories 1452 and 1457, respectively. The slave control layer 1485 may include a plurality of slave sub-control layers 1490. Sub-services 1462, 1467, 1472, and 1477 are executed on slave gateways 1461, 1466, 1471, and 1476, respectively, on the slave sub-control layer 1490.

When new devices 1468 and 1478 are added, the master gateway 1441 identifies service categories suitable for the devices and determines slave gateway groups 1450 and 1455 suitable for corresponding service categories. When the slave sub-control layer 1490 exists on the slave control layer 1485, the slave groups 1450 and 1455 search for the optimal gateway with sub-services of device.

When the master gateway 1441 has searched for a gateway and has not detected a group corresponding to a service category, it selects another gateway based on a substitute standard or creates a new group in the slave control layer 1485 to add a service category.

FIG. 15 is a flowchart of a method of suggesting a gateway to register a device in the gateway in a multi-gate environment according to an embodiment of the present invention.

Referring to FIG. 15, FIG. 15 shows a flow chart of a third method where the master gateway automatically adjusts a gateway to register a device through a periodic background task, described above with reference to FIG. 1.

The master gateway may automatically adjust a gateway to register a device through a periodic background task. The master gateway searches for a device mismatched with a gateway which is searched based on a service category in step S1505. The master gateway relocates the mismatched device to another gateway in step S1510, and selects performance parameters for the type of the device in step S1515. The master gateway collects raw data of the performance parameters measured for devices detected in the respective gateways, from the respective gateways in step S1520. The master gateway integrates the collected raw data by the respective gateways in step S1525, and determines whether the integrated raw data is available in step S1530.

When the master gateway ascertains that the integrated raw data is not available in step S1530, it determines whether the number of retransmissions is greater than zero in step S1535. When the master gateway ascertains that the number of retransmissions is greater than zero in step S1535, it returns to step S1520. On the contrary, when the master gateway ascertains that the number of retransmissions is not greater than zero in step S1535, it allocates zero to normalized data in step S1545 and stores the normalized data in step S1550.

When the master gateway ascertains that the integrated raw data is available in step S1530, it normalizes the data in step S1540 and stores the normalized data in step S1550. The master gateway creates a decision tree based on the normalized data in step S1555. The decision tree is made to create the total performance data used to suggest a gateway to register the device.

A gateway of which the total performance data is the highest is selected as a gateway to be suggested. The decision tree is created as follows. The normalized data is summed by reflecting weights according to the selected parameters to create the total performance data by respective gateways. The weights represent values allocated by performance parameters by types of devices, and are determined according to the initial set value that has been currently set. The more important the performance parameters by types of devices are when devices are registered in a gateway and then run, the larger the initial set value is. The initial set value may be determined by manufacturers or based on domain knowledge or empirical data. The master gateway compares the total performance data with each other and suggests a gateway with the highest total performance data.

The master gateway detects the total performance data of the respective gateways in step S1560, and determines whether there are gateways of which the total performance data are the same value in step S1565. When the master gateway ascertains that there are gateways of which the total performance data are the same value in step S1565, it re-adjusts the same value according to a preset rule and updates the decision tree in step S1570. The master gateway searches for the most suitable gateway (e.g. optimal gateway) for the respective devices based on the updated decision tree in step S1575. The master gateway automatically determines whether it can alter a gateway in which a device is registered in step S1580. When the master gateway ascertains that it can alter a gateway in which a device is registered in step S1580, it alters the gateway in step S1585). The master gateway adds the altered detail in a report in step S1590 and transmits the report to the user in step S1595.

On the contrary, when the master gateway ascertains that there are no gateways of which the total performance data are the same value in step S1565, it does not update the decision tree and proceeds to step S1575.

A background task of update may be periodically performed at a scheduled time. The time for performing a background task is scheduled based on the number of loads as the most primary condition. The background task is usually performed at midnight.

The master gateway performs an automatic adjustment task periodically at a pre-scheduled time. The master gateway checks all devices registered in all the gateways. The master gateway collects all the raw data obtained through measurement from other gateways, creates the decision tree described above, compares the total performance data, and determines the optimal gateway for the devices.

After the master gateway performing the automatic device adjustment task checks all the slave gateways and all the registered devices and identifies the optimal gateway, it notifies the user of the result or automatically transfers ownership of the device to the optimal gateway. These processes are managed according to a user's settings.

The following description is provided about a user's settings used to determine whether a gateway can be automatically altered in step S1580 of FIG. 15.

Figure 16:
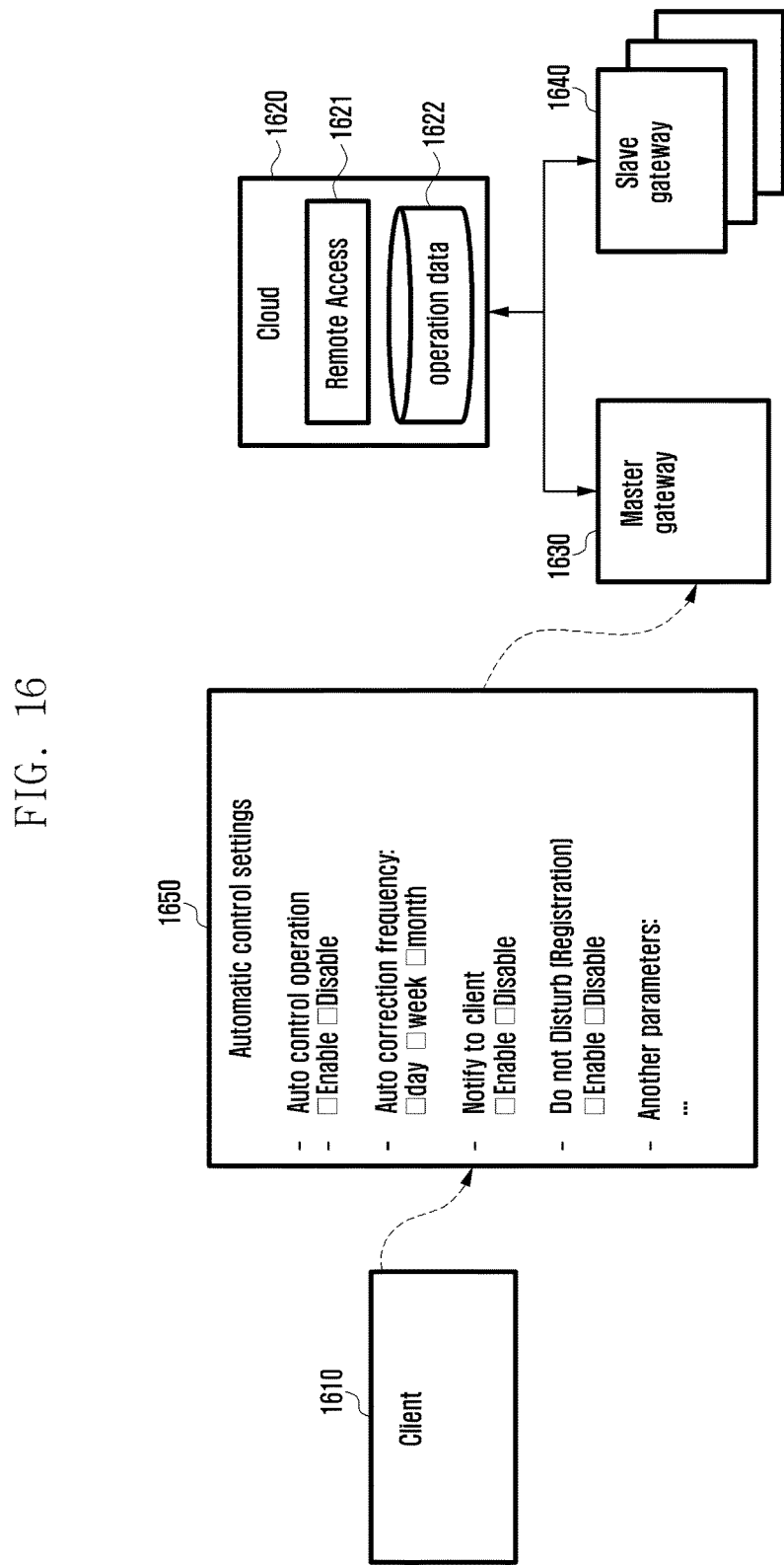
FIG. 16 is a block diagram of a method of a client to set an automatic adjustment of device registration through a periodic background task, according to an embodiment of the present invention.

FIG. 16 is a block diagram of a method of a client to set an automatic adjustment of device registration through a periodic background task, according to an embodiment of the present invention.

Referring to FIG. 16, the user may set the master gateway so that it can automatically adjust registration and management of devices. In the settings shown in FIG. 16, bolded values indicate default values. The client 1610 transfers details of automatic adjustment settings to the master gateway 1630. The automatic adjustment settings 1650 include options, such as options to enable/disable the client 1610 to perform an automatic adjustment operation, set a period, notify the client, etc.

FIG. 17 is an illustration of pseudo code of a background task of FIG. 16 according to an embodiment of the present invention.

In the following description, the alteration of a gateway in step S1585 of FIG. 15 is described in greater detail.

Figure 18A:
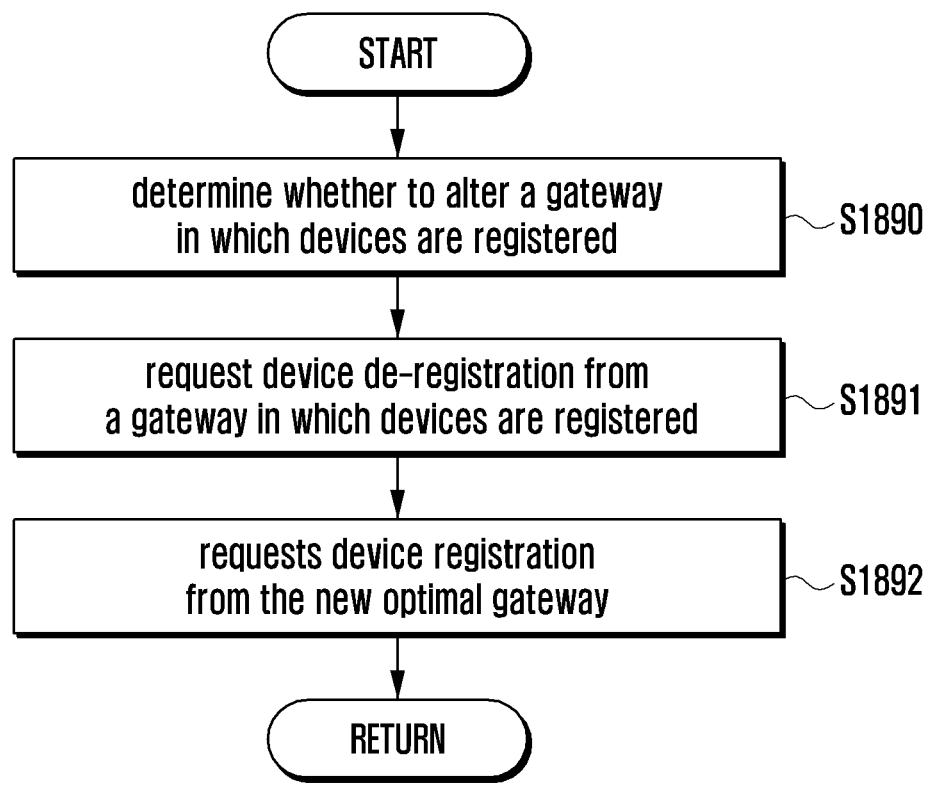
FIG. 18A is a flowchart of step S1585 of FIG. 15, in detail, according to an embodiment of the present invention.

FIG. 18A is a flowchart of a method of altering device registration when device registration is automatically adjusted through a periodic background task according to an embodiment of the present invention.

Figure 18B:
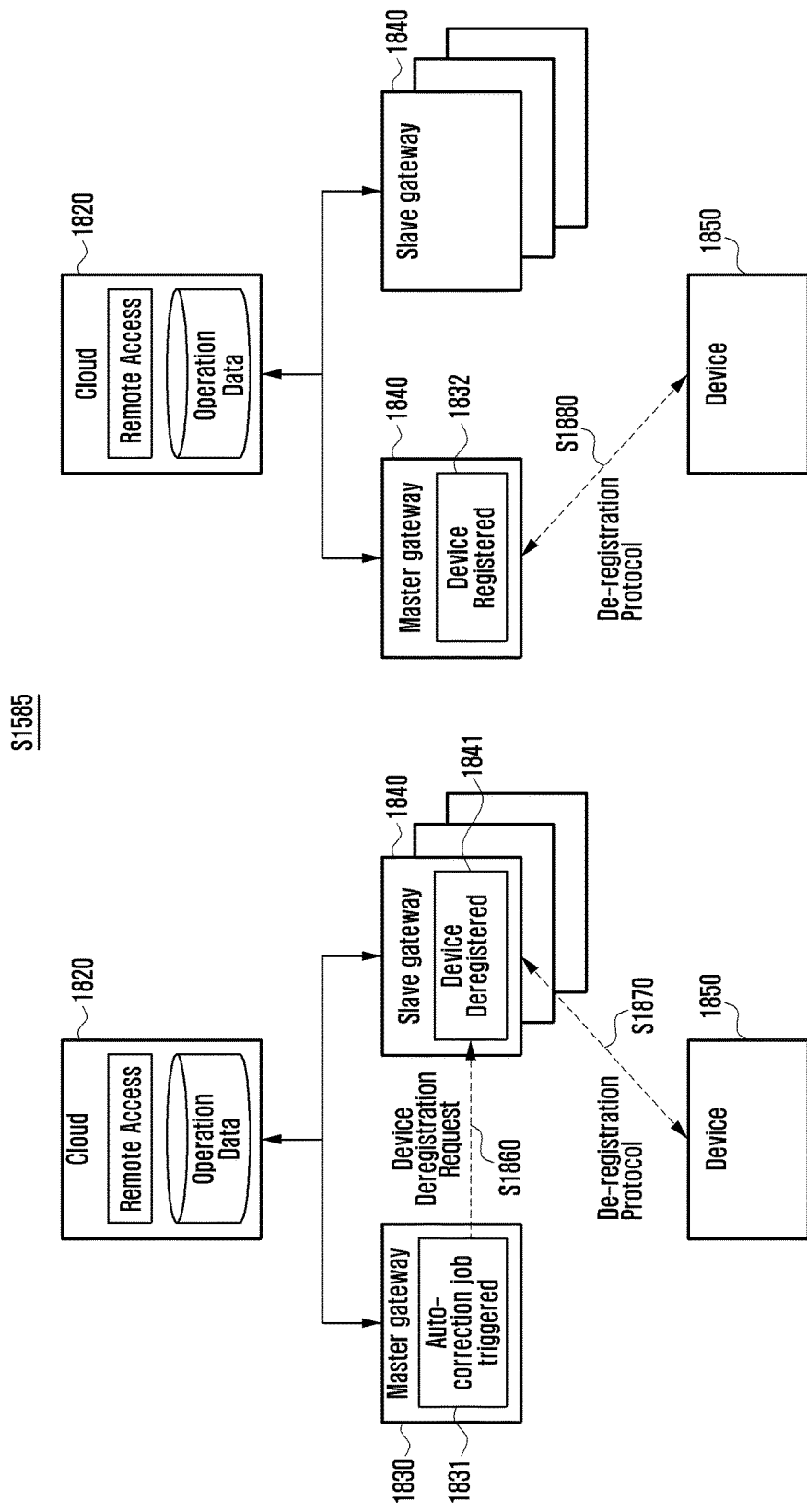
FIG. 18B is a block diagram of step S1585 of FIG. 15, in detail, according to an embodiment of the present invention.

FIG. 18B is a block diagram of a method of altering device registration when device registration is automatically adjusted through a periodic background task according to an embodiment of the present invention. FIG. 18B is a bock diagram corresponding to FIG. 18A.

Referring to FIG. 18A, the master gateway determines whether to alter a gateway in which devices are registered in step S1890. The master gateway transmits a de-registration request for de-registering devices to a gateway in which devices are registered in step S1891. The master gateway requests a gateway, newly determined as the optimal gateway, to perform device registration in step S1892. When device registration alteration occurs, the master gateway may notify the client of the alteration.

Referring to FIG. 18B, the master gateway 1830 triggers an automatic correction task for all the other gateways 1840 and requests the gateways to perform re-detection in 1831. All the available gateways measure performance parameters for the devices. The master gateway collects all the performance data obtained from the measurements from the other gateways and determines the optimal gateway for the device. The master gateway determines whether to alter device registration.

The master gateway transmits a de-registration request for de-registering devices to the slave gateway in which devices are registered in step S1860. The slave gateway de-registers devices though a de-registration protocol in step S1870. The master gateway requests the new optimal gateway to perform device registration and registers devices through the registration protocol in step S1880. In an embodiment of the present invention, the device is de-registered from the slave gateway and registered in the master gateway. When device registration alteration occurs, the master gateway may notify the client of the alteration.

Figure 19:
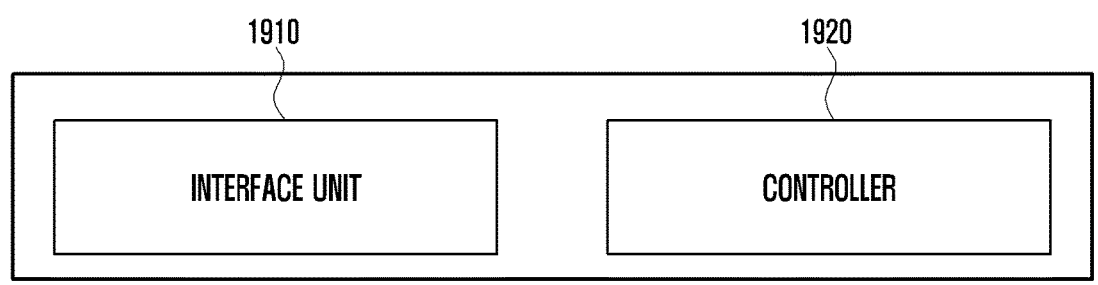
FIG. 19 is a block diagram of a master gateway according to an embodiment of the present invention.

FIG. 19 is a block diagram of a master gateway according to an embodiment of the present invention. The master gateway may include an interface unit 1910 and a controller 1920.

Referring to FIG. 19, the interface unit 1910 may establish communication in wireless mode and wired mode. The interface unit 1910 may transmit/receive information to/from at least one of a client, other gateways, and devices. The interface unit 1910 may receive data or control signals through a wired/wireless channel and output them to the controller 1920. The interface unit 1910 may transmit data or control signals output from the controller 1920 through a wired/wireless channel.

The controller 1920 controls the entire operation of the master gateway according to an embodiment of the present invention.

The controller 1920, according to an embodiment of the present invention, selects performance parameters that two or more gateways will measure; collects raw data as one or more values obtained by measuring performance parameters of devices that can be registered in the gateway; creates the total performance data used to register the device, based on at least one or more items of the raw data, by respective gateways; and registers the device in one gateway selected from two or more gateways, based on the total performance data.

The controller 1920, according to an embodiment of the present invention, determines a service category of a device to be registered; searches for a gateway based on the determined service category; and registers the device in the searched gateway.

The controller 1920, according to an embodiment of the present invention, selects a gateway with a high order of priority for the device at a period of a preset (e.g. scheduled) time, periodically. When a first gateway, which is selected at an arbitrary period and in which the device is registered, differs from a second gateway selected at a next period, the controller 1920, according to an embodiment of the present invention, requests the first gateway to de-register the device and the second gateway to register the device.

According to an embodiment of the present invention, users can efficiently select gateways for registering devices based on service categories of devices and/or performance parameters. Devices can be registered in the optimal gateway, thereby enhancing the system performance as a whole.

Although embodiments of the invention have been described in detail above, it should be understood that many variations and modifications of the present invention described herein, which may be apparent to those skilled in the art, will still fall within the scope and spirit of the present invention, as defined by the appended claims and their equivalents.

What is claimed is:

1. A method of a master gateway to register a device in a smart home network system, comprising:
    selecting performance parameters related to the device measured by at least two gateways including the master gateway;
    collecting, from the at least two gateways, at least one first information item about the performance parameters measured for the device capable of being registered in the at least two gateways;
    creating second information used to register the device, based on the at least one first information item, by the at least two gateways; and
    instructing one of the at least two gateways to register the device, based on the second information.

2. The method of claim 1, wherein selecting the performance parameters comprises:
    selecting performance parameters based on a type of the device to be registered.

3. The method of claim 2, wherein creating the second information comprises:
    normalizing the at least one first information item;
    checking weights according to the performance parameters of the device; and
    summing the normalized at least one first information item, based on the weights.

4. The method of claim 3, wherein instructing one of the at least two gateways to register the device comprises:
    determining an order of priority of the at least two gateways based on the second information; and
    selecting one of the at least two gateways that has a highest order of priority.

5. The method of claim 4, wherein determining the order of priority of the at least two gateways comprises:
    re-creating, when the second information is the same, the second information by excluding the first information item of which the performance parameter has the lowest weight, and determining the order of priority.

6. The method of claim 5, wherein instructing one of the at least two or more gateways to register the device comprises:
    selecting one of the at least two gateways with a highest order of priority for the device at a preset time, periodically; and
    requesting, when one of the at least two gateways, which is selected at an arbitrary period and in which the device is registered, differs from another of the at least two gateways selected at a next period, the one of the at least two gateways selected at the arbitrary period to de-register the device and the another of the at least two gateways selected at the next period to register the device.

7. A method of a master gateway to register a device in a smart home network system, comprising:
    determining a service category of the device to be registered;
    searching for a gateway based on the determined service category; and
    instructing, when the gateway is searched, the searched gateway to register the device.

8. The method of claim 7, further comprising:
    searching for another gateway based on a substitute standard when the gateway has been searched based on the determined service category; and
    registering the device in the another gateway searched based on the substitute standard,
    wherein the substitute standard comprises at least one of performance, user preference, or user option.

9. The method of claim 8, wherein instructing, when the gateway is searched, the searched gateway to register the device comprises:
    determining whether the searched gateway is in an overload state;
    searching for the another gateway based on the substitute standard when the searched gateway is in the overload state; and
    instructing the another gateway searched based on the substitute standard to register the device.

10. The method of claim 9, wherein instructing the searched gateway to register the device comprises:
    searching for the gateway, at a preset time, periodically; and
    requesting, when a first gateway, which is selected at an arbitrary period and in which the device is registered, differs from a second gateway selected at a next period, the first gateway to de-register the device and the second gateway to register the device.

11. A master gateway for registering a device in a smart home network system comprising:
    an interface unit configured to transmit and receive information to/from at least one of clients, other gateways and devices; and
    a controller configured to select performance parameters related to the device measured by at least two gateways including the master gateway; collect, from the at least two gateways, at least one first information item about the performance parameters measured for the device capable of being registered in the at least two gateways; create second information used to register the device, based on the at least one first information item, by the at least two gateways; and instruct one of the at least two gateways to register the device, based on the second information.

12. The master gateway of claim 11, wherein the controller is further configured to select performance parameters based on a type of the device to be registered.

13. The master gateway of claim 12, wherein the controller is further configured to normalize the at least one first information item; check weights according to the performance parameters of the device; and sum the normalized at least one first information item, based on the weights.

14. The master gateway of claim 13, wherein the controller is further configured to determine an order of priority of the at least two gateways based on the second information; and selects one of the gateways that has a highest order of priority.

15. The master gateway of claim 14, wherein the controller is further configured to recreate, when the second information is the same, the second information by excluding the first information item of which the performance parameter has the lowest weight, and determine the order of priority.

16. The master gateway of claim 15, wherein the controller is further configured to select one of the at least two gateways with the highest order of priority for the device at a preset time, periodically; and request, when a first gateway, which is selected at an arbitrary period and in which the device is registered, differs from a second gateway selected at a next period, the first gateway to de-register the device and the second gateway to register the device.

17. A master gateway for registering a device in a smart home network system, comprising:
 an interface unit configured to transmit and receive information to and from at least one of clients, other gateways, and devices; and
 a controller configured to determine a service category of the device to be registered; search for a gateway based on the determined service category; and instruct, when the gateway is searched, the searched gateway to register the device.

18. The master gateway of claim 17, wherein the controller is further configured to search for another gateway based on a substitute standard when the gateway has been searched based on the determined service category; and register the device in the another gateway searched based on the substitute standard, wherein the substitute standard comprises at least one of:
 performance, user preference, and option.

19. The master gateway of claim 18, wherein the controller is further configured to determine whether the searched gateway is in an overload state; search for the another gateway based on the substitute standard when the searched gateway is in the overload state; and instruct the another gateway searched based on the substitute standard to register the device.

20. The master gateway of claim 19, wherein the controller is further configured to search for the gateway, at a preset time, periodically; and request, when a first gateway, which is selected at an arbitrary period and in which the device is registered, differs from a second gateway selected at a next period, the first gateway to de-register the device and the second gateway to register the device.

* * * * *